United States Patent
Siminoff et al.

(10) Patent No.: US 10,742,901 B2
(45) Date of Patent: Aug. 11, 2020

(54) AUDIO/VIDEO RECORDING AND COMMUNICATION DEVICES WITH MULTIPLE CAMERAS FOR SUPERIMPOSING IMAGE DATA

(71) Applicant: Amazon Technologies, Inc., Seattle, WA (US)

(72) Inventors: James Siminoff, Pacific Palisades, CA (US); Mark Siminoff, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/391,470

(22) Filed: Apr. 23, 2019

(65) Prior Publication Data

US 2019/0253642 A1    Aug. 15, 2019

Related U.S. Application Data

(63) Continuation of application No. 15/887,865, filed on Feb. 2, 2018, now Pat. No. 10,284,792.
(Continued)

(51) Int. Cl.
*H04N 5/272* (2006.01)
*H04N 7/18* (2006.01)
(Continued)

(52) U.S. Cl.
CPC .......... *H04N 5/272* (2013.01); *H04N 5/2258* (2013.01); *H04N 5/77* (2013.01); *H04N 7/186* (2013.01); *H04N 7/188* (2013.01); *H04N 9/8227* (2013.01)

(58) Field of Classification Search
CPC ........ H04N 5/272; H04N 5/2258; H04N 5/77; H04N 7/186; H04N 7/188; H04N 9/8227;
(Continued)

(56) References Cited

U.S. PATENT DOCUMENTS 4,764,953 A    8/1988   Chern et al.
5,428,388 A    6/1995   von Bauer et al.
(Continued)

FOREIGN PATENT DOCUMENTS

CN    2585521 Y    11/2003
CN    2792061 Y    6/2006
(Continued)

*Primary Examiner* — Nicholas G Giles
(74) *Attorney, Agent, or Firm* — Greenberg Truarig, LLP

(57) ABSTRACT

Audio/video (A/V) recording and communication devices with multiple cameras for superimposing image data in accordance with various embodiments of the present disclosure are provided. In one embodiment, an audio/video (A/V) recording and communication device comprising: a first camera configured to capture image data at a first resolution; a second camera configured to capture image data at a second resolution that is higher than the first resolution; a memory including a rolling buffer; a communication module; and a processing module comprising: a processor; and a camera application that configures the processor to: capture first image data using the first camera; store the first image data in the rolling buffer of the memory; maintain the second camera in a low-power state; power up the second camera in response to motion detection; capture second image data using the second camera; and superimpose the first image data onto the second image data.

20 Claims, 21 Drawing Sheets

Related U.S. Application Data

(60) Provisional application No. 62/454,220, filed on Feb. 3, 2017.

(51) Int. Cl.
*H04N 5/77* (2006.01)
*H04N 5/225* (2006.01)
*H04N 9/82* (2006.01)

(58) Field of Classification Search
CPC ......... H04N 5/23245; H04N 5/232933; H04N 5/232935; H04N 5/232939
See application file for complete search history.

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,137,433 B2 | 9/2015 | Mojaver |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0063711 A1 | 5/2002 | Park et al. |
| 2002/0075258 A1* | 6/2002 | Park ............... H04N 5/232 345/419 |
| 2002/0094111 A1 | 7/2002 | Puchek et al. |
| 2002/0147982 A1 | 10/2002 | Naidoo et al. |
| 2002/0180759 A1 | 12/2002 | Park et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2004/0212678 A1 | 10/2004 | Cooper |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0037056 A1 | 2/2006 | Pulitzer |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2012/0038776 A1 | 2/2012 | Ahiska et al. |
| 2013/0057695 A1 | 3/2013 | Huisking |
| 2013/0070103 A1 | 3/2013 | Mojaver |
| 2014/0267716 A1 | 9/2014 | Child et al. |
| 2015/0163463 A1 | 6/2015 | Hwang et al. |
| 2016/0330403 A1 | 11/2016 | Siminoff |
| 2016/0381289 A1* | 12/2016 | Kim ............... H04N 5/23222 348/38 |

FOREIGN PATENT DOCUMENTS

| | | |
|---|---|---|
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-157650 A | 6/2006 |
| JP | 2006-262342 A | 9/2006 |
| JP | 2009-008925 A | 1/2009 |
| WO | 9826389 A1 | 6/1998 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

AUDIO/VIDEO RECORDING AND COMMUNICATION DEVICES WITH MULTIPLE CAMERAS FOR SUPERIMPOSING IMAGE DATA

CROSS-REFERENCE TO RELATED APPLICATIONS

This application is a continuation of application Ser. No. 15/887,865, filed on Feb. 2, 2018, which claims priority to provisional application Ser. No. 62/454,220, filed on Feb. 3, 2017. The entire contents of the priority applications are hereby incorporated by reference as if fully set forth.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present audio/video (A/V) recording and communication devices with multiple cameras now will be discussed in detail with an emphasis on highlighting the advantageous features. These embodiments depict the novel and non-obvious A/V recording and communication devices with multiple cameras shown in the accompanying drawings, which are for illustrative purposes only. These drawings include the following figures, in which like numerals indicate like parts.

DETAILED DESCRIPTION

Figure 1:
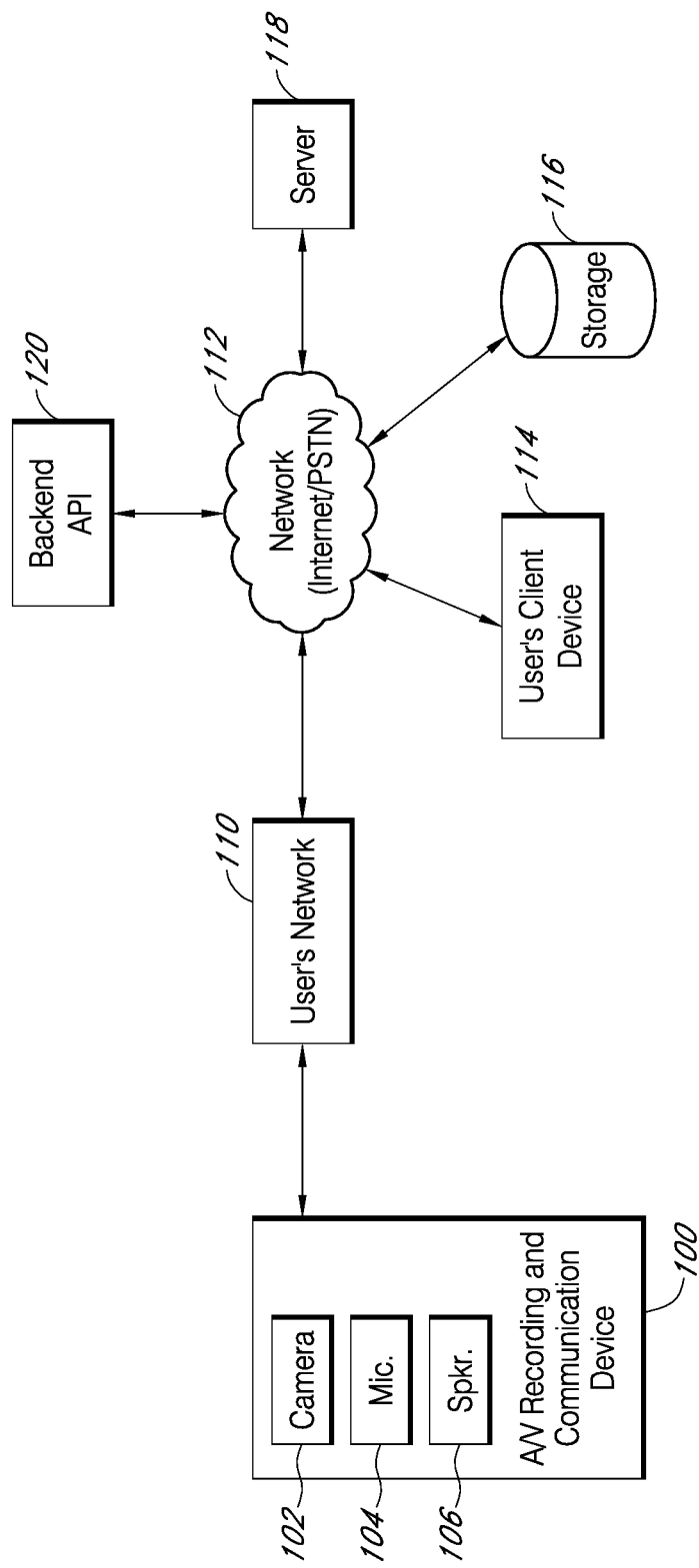
FIG. 1 is a functional block diagram illustrating a system for streaming and storing A/V content captured by an audio/video (A/V) recording and communication device according to various aspects of the present disclosure.

The various embodiments of the present audio/video (A/V) recording and communication devices with multiple cameras have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that A/V recording and communication devices could be enhanced by adding at least a second camera. For example, two cameras working in tandem could enable functionality that might not be possible with only one camera. For example, in some embodiments the second camera could have different performance characteristics from the first camera, such as different resolution and/or different power consumption. The low-power, low-res camera may be powered on at all times, while the high-power, high-res camera is typically powered off. The low-power, low-res camera can then be used in a process for determining when to power on the high-power, high-res camera. This arrangement can have particular benefit in a battery-powered A/V recording and communication device, where conserving battery power is desirable to prolong the usable life of the device between battery recharges. In some embodiments, video footage recorded by the low-power, low-res camera can be added to the stream from the high-power, high-res camera to create a pre-roll. Also in some embodiments, the two cameras may be arranged so that their fields of view are coincident (or at least overlapping). The low-power, low-res camera may record video footage before the high-power, high-res camera is powered up, and after the high-power, high-res camera powers up the video footage recorded by the high-power, high-res camera can be used instead of the video footage recorded by the low-power, low-res camera (e.g., the high-power, high-res camera, upon power up, takes over for the low-power, low-res camera).

Another aspect of the present embodiments includes the realization that in current A/V recording and communication devices other than the present embodiments, streaming video that is sent from the A/V recording and communication device to the user's client device does not include any images of events that took place prior to the event that triggered the sending of the streaming video. For example, when the A/V recording and communication device detects an event, such as motion in the area about the A/V recording and communication device or a visitor pressing the front button of the A/V recording and communication device (when the A/V recording and communication device is a doorbell), the streaming video that is sent from the A/V recording and communication device to the user's client device begins at (or just after) the moment that the motion was detected or the front, button was pressed. Often, however, the events that occurred just prior to the event detection are of interest to the user. The present embodiments solve this problem by continuously recording, with the camera of the A/V recording and communication device, the area within the field of view of the camera, and then, when an event is detected, beginning the streaming video at a time that is prior to the event detection. The continuously recorded video images are stored in a rolling buffer, and the streaming video includes images stored in the rolling buffer. The present embodiments thus advantageously enable the user to view video images of events that happened just prior to the detected event, thereby delivering more information to the user to help the user better understand what is taking place in the streaming video.

A further aspect of the present embodiments includes the realization that A/V recording and communication devices, and the user experience associated with using such devices, could be enhanced by providing higher quality video footage ("video footage" may also be referred to as "image data"). For example, low-resolution video footage may make it harder to correctly identify a person and/or to determine what actions are taking place in the video footage. Further, low-resolution video footage may make it harder for a user to determine the location that the user is actually viewing.

For example, in some embodiments, A/V recording and communication devices may have multiple cameras with overlapping (or substantially coincident) fields of view, where one camera is always on and continuously capturing low-resolution footage and another camera is selectively powered up and captures high-resolution footage. In such embodiments, the A/V recording and communication devices may have both low-resolution and high-resolution footage of the same scene, but only low-resolution footage and not high-resolution footage of a particular time sequence. Thus, it would be advantageous, therefore, to superimpose portions of the low-resolution footage onto portions of the high-resolution footage, and/or vice versa, to generate footage of a specific time sequence appearing of higher quality to the user. These and other aspects and advantages of the present embodiments are described in further detail below.

The following detailed description describes the present embodiments with reference to the drawings. In the drawings, reference numbers label elements of the present embodiments. These reference numbers are reproduced below in connection with the discussion of the corresponding drawing features.

The embodiments of the present audio/video (A/V) recording and communication devices with multiple cameras for superimposing image data are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p or better. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication and/or computing device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LA/V (Local Area Network), a WA/V (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GNSS (global navigation satellite system, e.g., GPS (Global Positioning System)), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
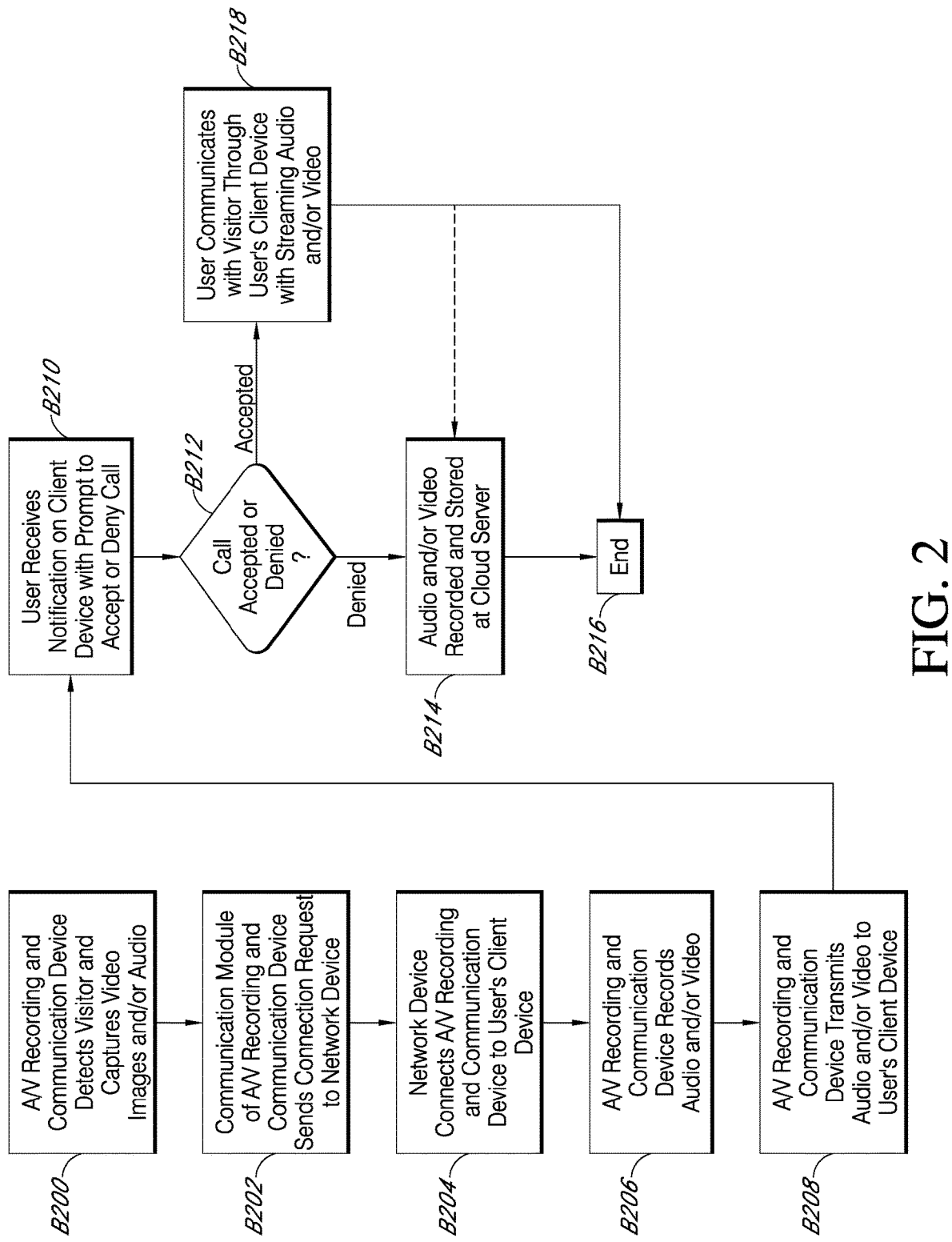
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
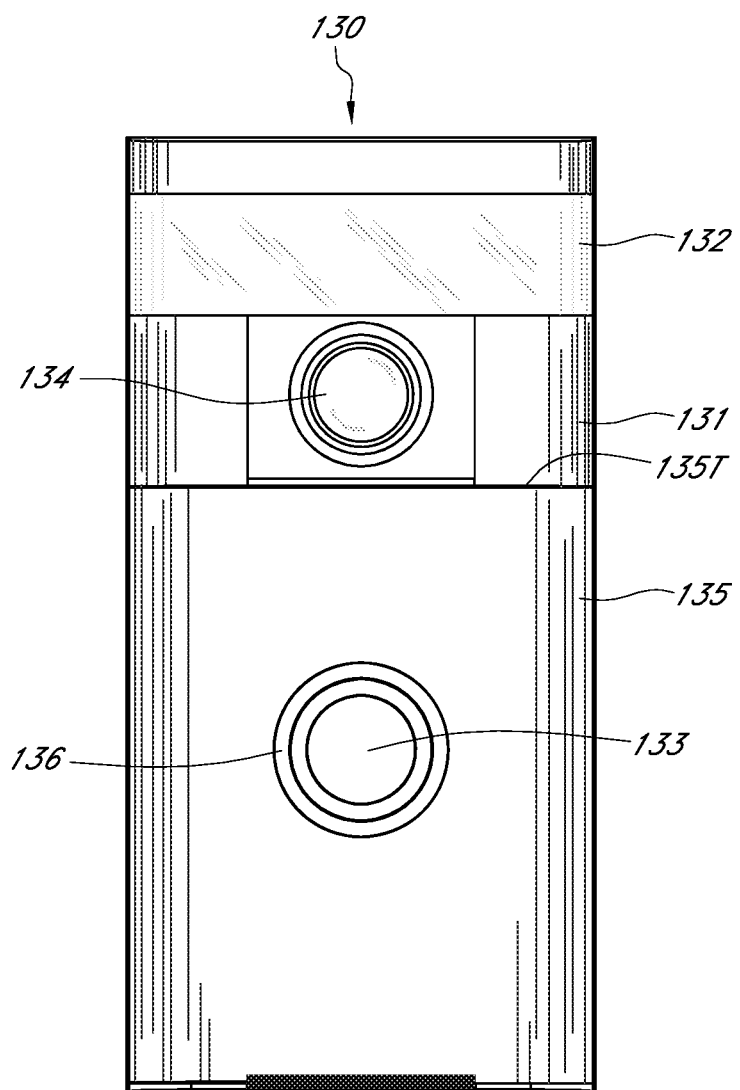
FIG. 3 is a front view of an A/V recording and communication device according to various aspects of the present disclosure.
Figure 4:
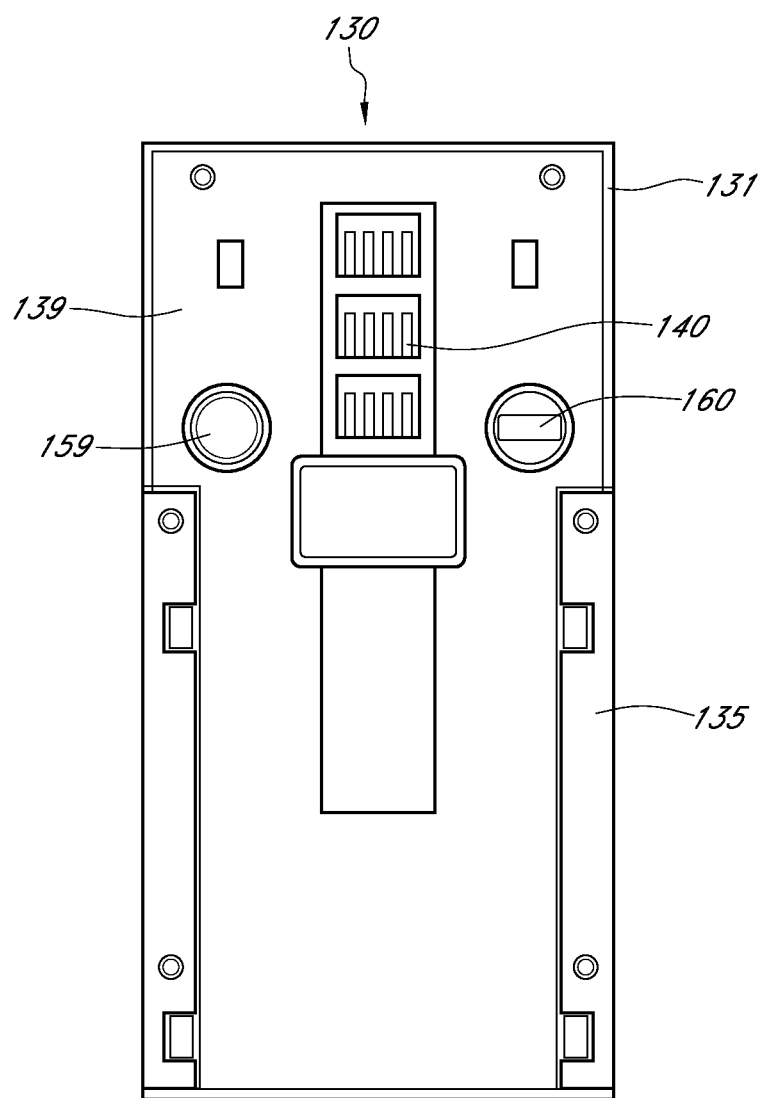
FIG. 4 is a rear view of the A/V recording and communication device of FIG. 3.
Figure 5:
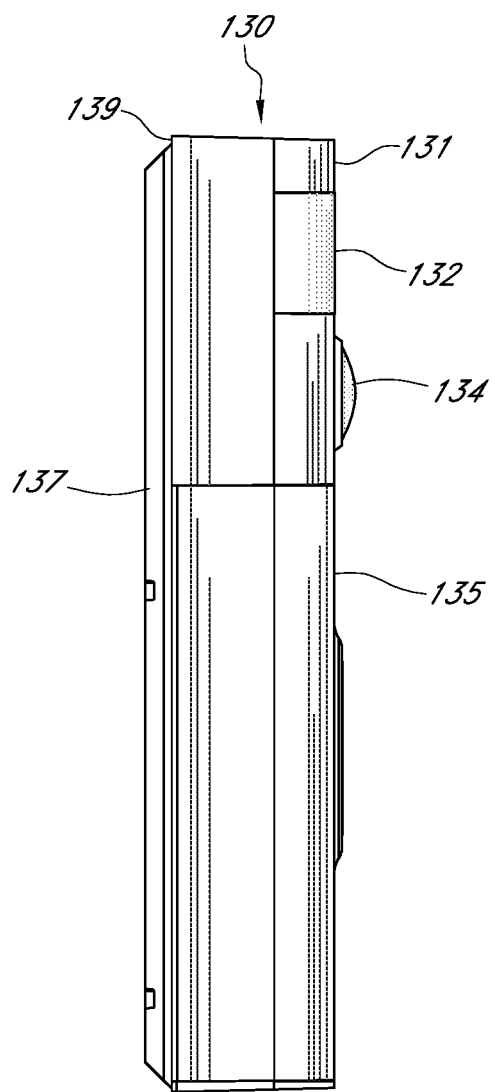
FIG. 5 is a left side view of the A/V recording and communication device of FIG. 3 attached to a mounting bracket according to various aspects of the present disclosure.

FIGS. 3-5 illustrate a wireless audio/video (A/V) communication doorbell 130 according to an aspect of present embodiments. FIG. 3 is a front view, FIG. 4 is a rear view, and FIG. 5 is a left side view of the doorbell 130 coupled with a mounting bracket 137. The doorbell 130 includes a faceplate 135 mounted to a back plate 139 (FIG. 4). With reference to FIG. 5, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 3 and 5, the doorbell 130 further includes an enclosure 131 that engages the faceplate 135. In the illustrated embodiment, the enclosure 131 abuts an upper edge 135T (FIG. 3) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 5, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 6:
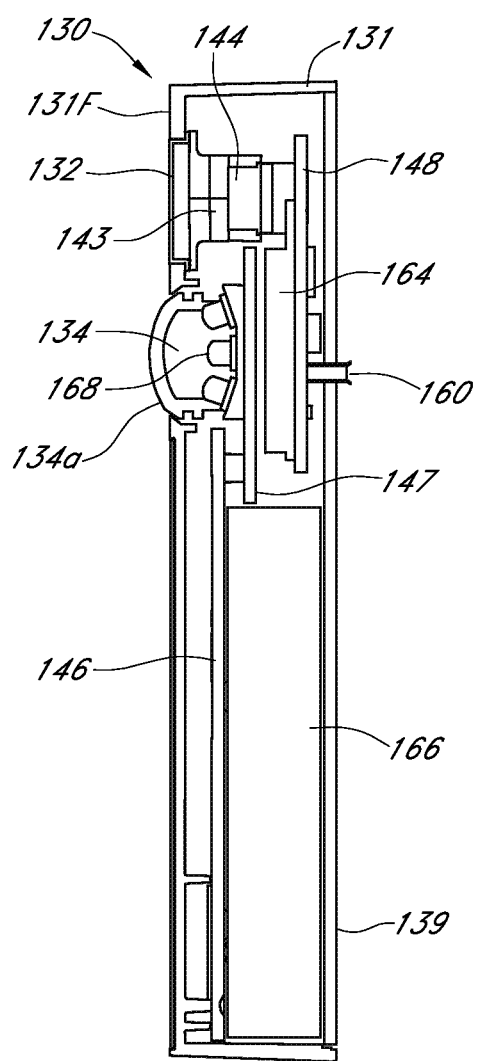
FIG. 6 is cross-sectional right side view of the A/V recording and communication device of FIG. 3.

FIG. 6 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 6, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

With continued reference to FIG. 6, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 6, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. In some embodiments, the doorbell 130 may comprise three PIR sensors 144, as further described below, but in other embodiments any number of PIR sensors 144 may be provided. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 7:
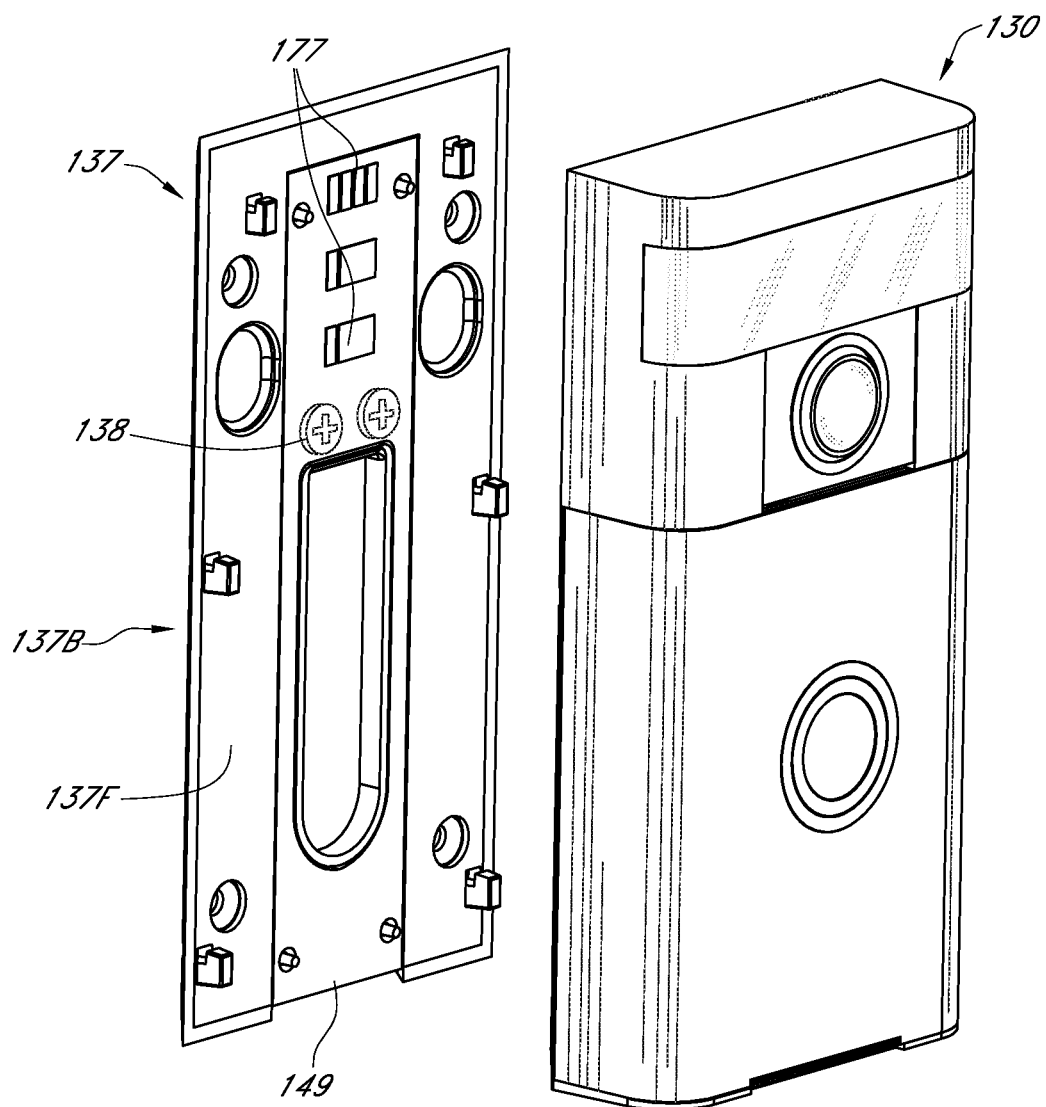
FIG. 7 is an exploded view of the A/V recording and communication device and the mounting bracket of FIG. 5.

FIG. 7 is an exploded view of the doorbell 130 and the mounting bracket 137 according to an aspect of the present embodiments. The mounting bracket 137 is configured to be mounted to a mounting surface (not shown) of a structure, such as a home or an office. FIG. 7 shows the front side 137F of the mounting bracket 137. The mounting bracket 137 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 7, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 8:
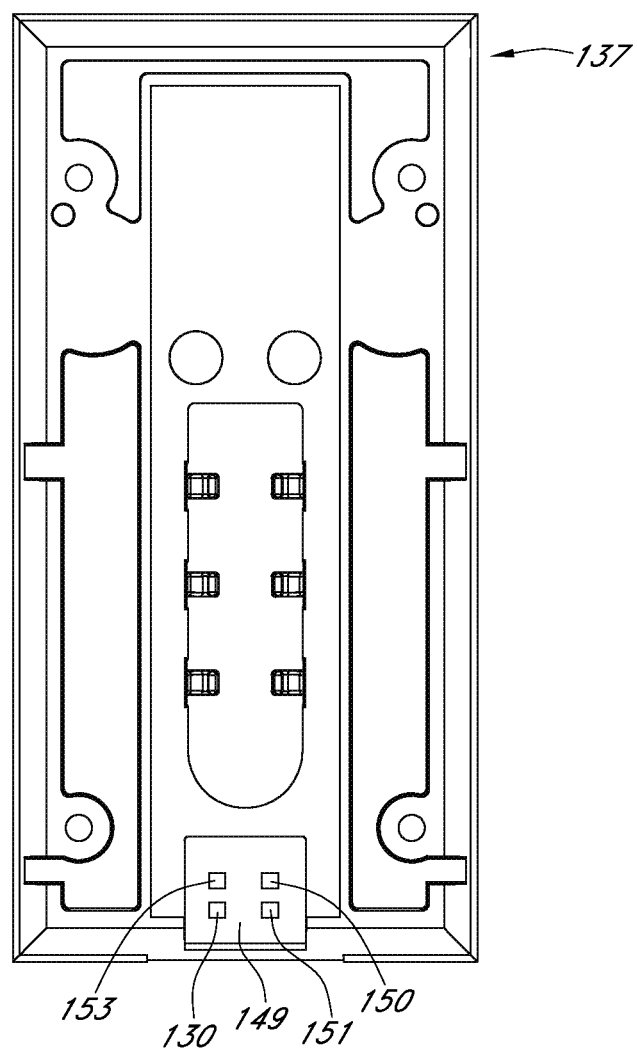
FIG. 8 is a rear view of the mounting bracket of FIG. 5.

With reference to FIGS. 7 and 8 (which is a rear view of the mounting bracket 137), the mounting bracket 137 further comprises a bracket PCB 149. With reference to FIG. 8, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 9:
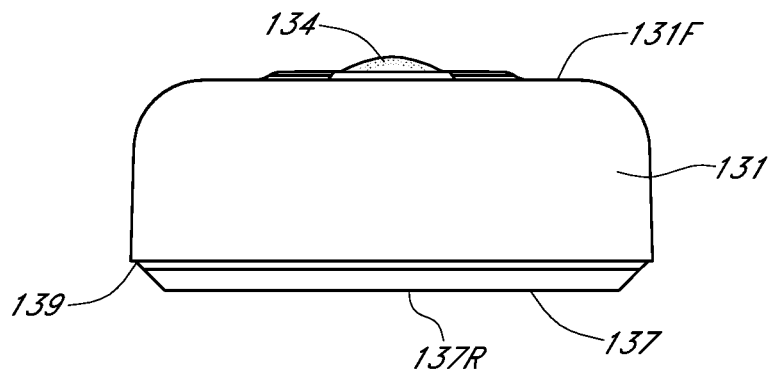
FIGS. 9 and 10 are top and bottom views, respectively, of the A/V recording and communication device and the mounting bracket of FIG. 5.
Figure 10:
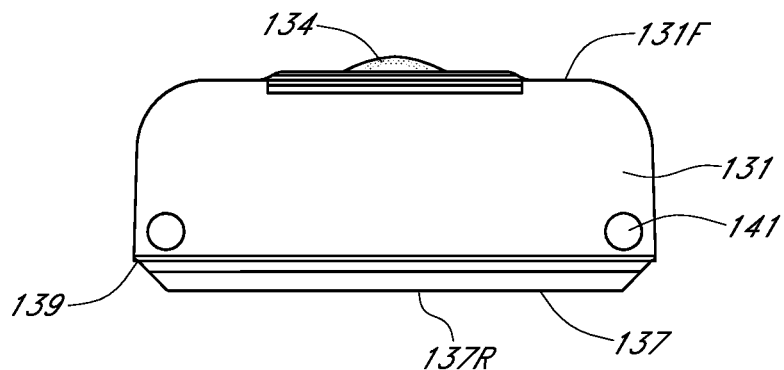

FIGS. 9 and 10 are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 10, the lower end of the enclosure 131 may include security screw apertures 141 configured to receive screws or other fasteners.

Figure 11:
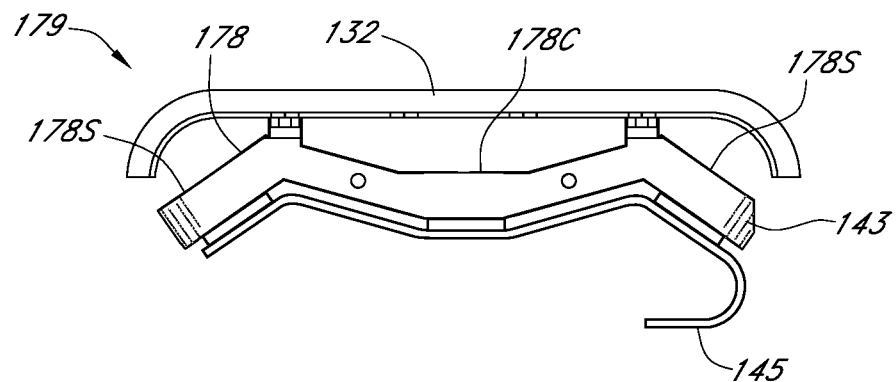
FIG. 11 is a top view of a passive infrared sensor assembly according to various aspects of the present disclosure.
Figure 12:
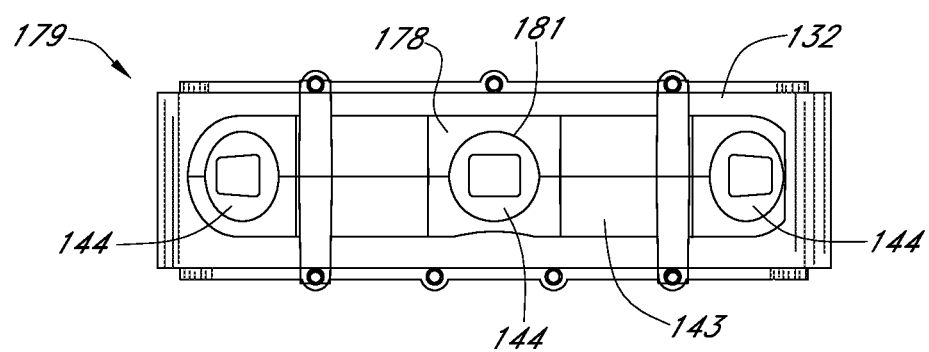
FIG. 12 is a front view of the passive infrared sensor assembly of FIG. 11.

FIG. 11 is a top view and FIG. 12 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 12, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 11, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 13:
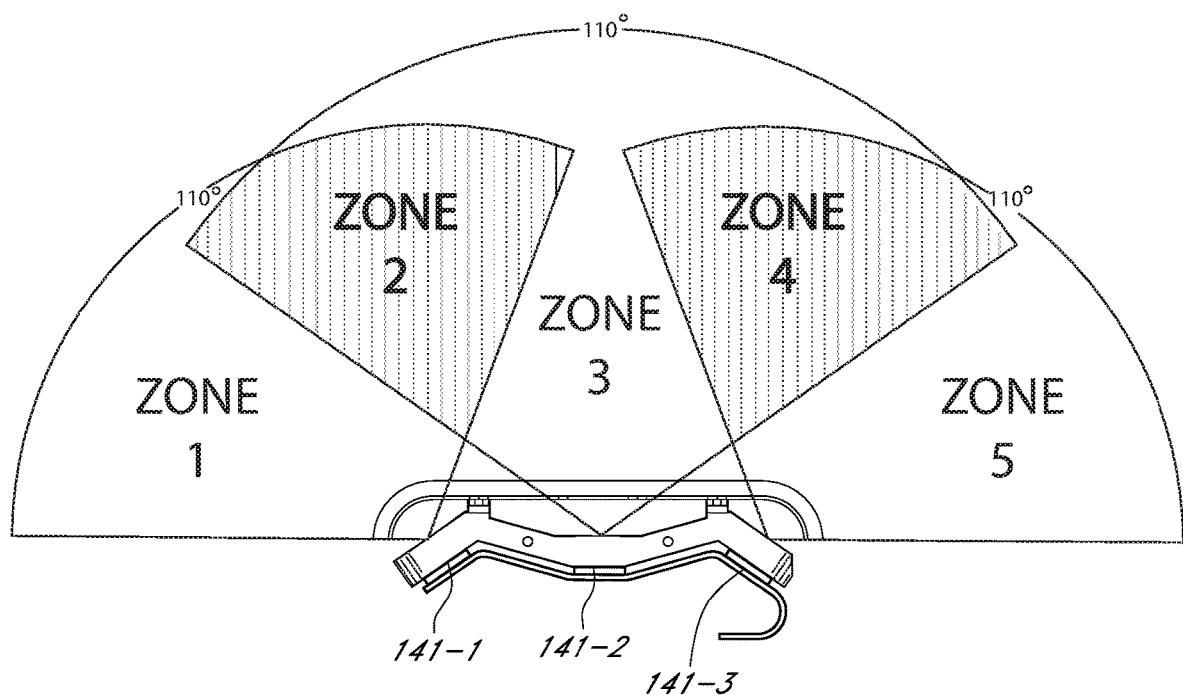
FIG. 13 is a top view of the passive infrared sensor assembly of FIG. 11, illustrating the fields of view of the passive infrared sensors according to various aspects of the present disclosure.

FIG. 13 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some embodiments, the doorbell 130 may be capable of determining the direction that an object is moving based upon which zones are triggered in a time sequence.

Figure 14:
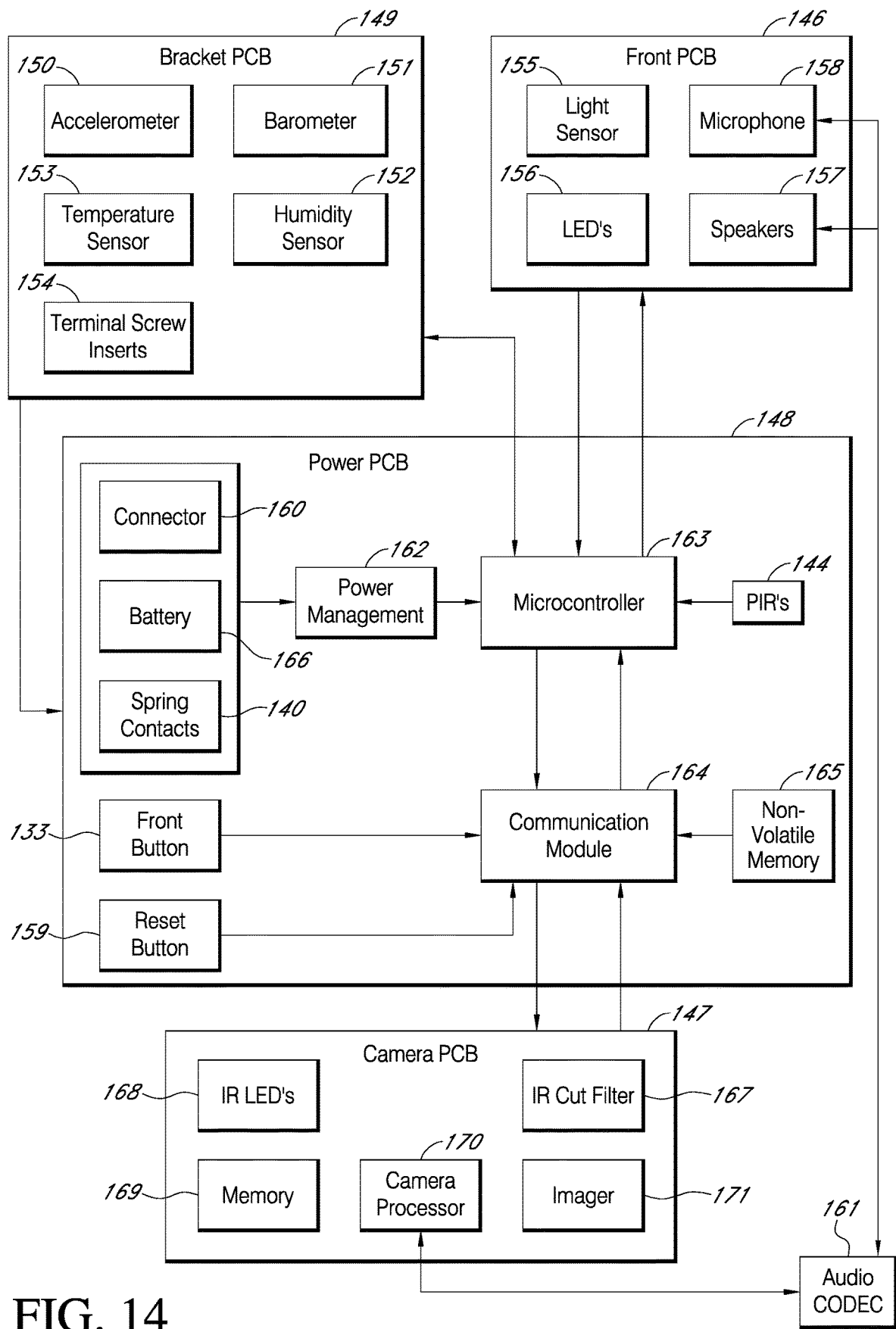
FIG. 14 a functional block diagram of the components of the A/V recording and communication device of FIG. 3.

FIG. 14 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 14, the bracket PCB 149 may further comprise terminal screw inserts 154, which may be configured to receive the terminal screws 138 and transmit power to the electrical contacts 177 on the mounting bracket 137 (FIG. 7). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 14, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 14, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160. The power management module 162 may also serve as a conduit for data between the connector 160 and the microcontroller 163.

With further reference to FIG. 14, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 14, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 14, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

As described above, the present embodiments leverage the capabilities of audio/video (A/V) recording and communication devices, thereby providing enhanced functionality to such devices to reduce crime and increase public safety. One aspect of the present embodiments includes the realization that A/V recording and communication devices, and the user experience associated with using such devices, could be enhanced by providing higher quality video footage ("video footage" may also be referred to as "image data"). For example, low-resolution video footage may make it harder to correctly identify a person and/or to determine what actions are taking place in the video footage. Further, low-resolution video footage may make it harder for a user to determine the location that the user is actually viewing. For example, in some embodiments, A/V recording and communication devices may have multiple cameras with overlapping (or substantially coincident) fields of view, where one camera is always on and continuously capturing low-resolution footage and another camera is selectively powered up and captures high-resolution footage. In such embodiments, the A/V recording and communication devices may have both low-resolution and high-resolution footage of the same scene but only low-resolution footage and not high-resolution footage of a particular time sequence. Thus, it would be advantageous, therefore, to superimpose portions of the low-resolution footage onto portions of the high-resolution footage, and/or vice versa, to generate footage of a specific time sequence appearing of higher quality to the user.

Figure 15:
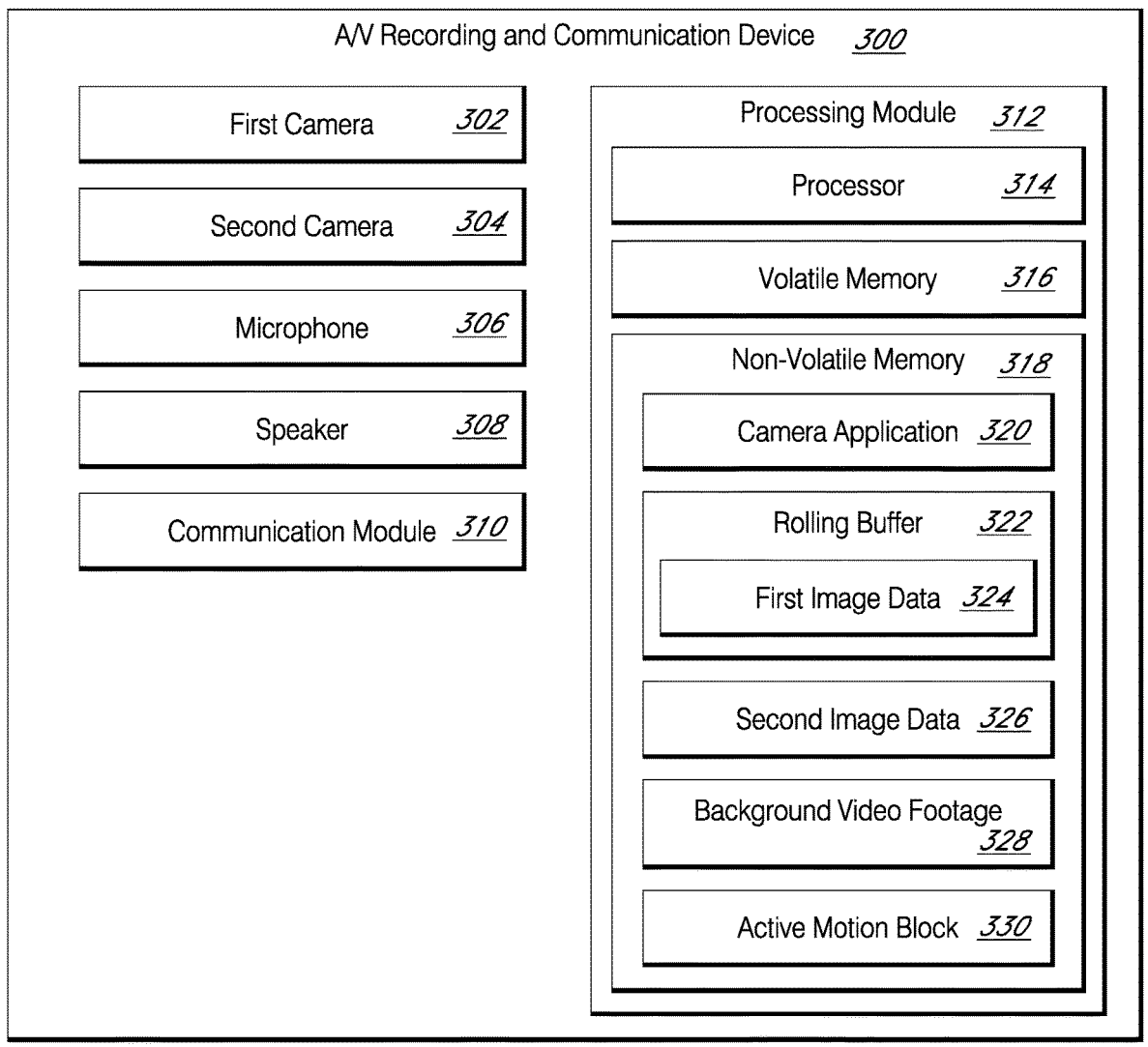
FIG. 15 is a functional block diagram illustrating one embodiment of an A/V recording and communication device according to various aspects of the present disclosure.

FIG. 15 is a functional block diagram illustrating one embodiment of an A/V recording and communication device 300 according to various aspects of the present disclosure. In some embodiments, the A/V recording and communication device 300 may be used with the system illustrated in FIG. 1. For example, the A/V recording and communication device 300 may take the place of the A/V recording and communication device 100, or may be used in conjunction with the A/V recording and communication device 100.

With reference to FIG. 15, the A/V recording and communication device 300 may comprise a processing module 312 that is operatively connected to a first camera 302, a second camera 304, a microphone 306, a speaker 308, and a communication module 310. The processing module 312 may comprise a processor 314, volatile memory 316, and non-volatile memory 318 that includes a camera application 320 and a rolling buffer 322. The camera application 320 may configure the processor 314 to capture first image data 324 using the first camera 302 at a first resolution and store (may also be referred to as "save") the first image data 324 in the rolling buffer 322, as further described below. In some embodiments, the rolling buffer 322 may be configured to store a specific amount of data, such as (but not limited to) 10-15 seconds of the first image data 324. The camera application 320 may also configure the processor 314 to maintain the second camera 304 in a powered down state (may also be referred to as a hibernation state, or a low-power state, or an off state, or the like). In various embodiments, the camera application 320 may also configure the processor 314 to power up the second camera 304 in response to motion detection, as further described below. The camera application 320 may further configure the processor 314 to capture second image data 326 using the second camera 304 at a second resolution and store the second image data 326 in the non-volatile memory 318. In various embodiments, the camera application 320 may also configure the processor 314 to perform one or more processes for superimposing image data using the first image data 324 and the second image data 326, as further described below. In some embodiments, the camera application 320 may configure the processor 314 to generate background video footage 328 using the second image data 326 and determine at least one motion block 330 using the first image data 324, as further described below, where the background video footage 328 and the at least one active motion block 330 may be saved in the non-volatile memory 318. In alternative embodiments, the rolling buffer 322 may be implemented in the volatile memory 316, or in a combination of the volatile memory 316 and the non-volatile memory 318. Further, in alternative embodiments, the first image data 324, the second image data 326, the background video footage 328, and/or the at least one active motion block 330 may be stored in the volatile memory 316, or in a combination of the volatile memory 316 and the non-volatile memory 318.

In further reference to FIG. 15, the communication module 310, may comprise (but is not limited to) one or more transceivers and/or wireless antennas (not shown) configured to transmit and receive wireless signals. In further embodiments, the communication module 310 may comprise (but is not limited to) one or more transceivers configured to transmit and receive wired and/or wireless signals. In addition, the A/V recording and communication device 300 may be similar in structure and/or function to the A/V recording and communication device 130 (FIGS. 3-14), with the added feature of a second camera. For example, the A/V recording and communication device 300 may include a first camera similar (or identical) in structure and/or function to the camera 134 of the A/V recording and communication device 130, and a second camera. In certain embodiments, the second camera may also be similar (or identical) in structure and/or function to the camera 134 of the A/V recording and communication device 130.

In further reference to FIG. 15, the first and second cameras 302, 304 may differ from one another in one or more ways. For example, the first resolution of the first camera 302 and the second resolution of the second camera 304 may be different. In some embodiments, the first resolution may be higher than the second resolution, or vice versa. The different resolutions of the first and second cameras 302, 304 may result in the lower resolution camera also consuming less power than the higher resolution camera. In some embodiments, the first camera 302, which may have a lower resolution and/or consume less power than the second camera 304, may remain in a persistent powered up state (e.g., the first camera 302 may be powered on and recording image data at all times). The second camera 304, however, which may have a higher resolution and/or consume more power than the first camera 302, may remain in a low-power state most of the time. This configuration, in which the first camera 302 is always powered on and the second camera 304 is usually powered down, advantageously conserves power, which is of particular advantage in embodiments in which the A/V recording and communication device 300 is powered by a rechargeable battery (e.g., is not connected to a source of external power, such as AC mains). The second camera 304 may be powered up to capture image data only at certain times, as described below, and may revert to the low-power state after a condition (e.g., motion in the field of view or motion zone) that caused the second camera 304 to power up is no longer extant. In some embodiments, when the second camera 304 is powered up, the first camera 302 may power down in order to conserve the battery. The first camera 302 may then power up again when the second camera 304 again powers down. In alternative embodiments, one of the cameras 302, 304 may consume less power than the other camera 304, 302 even if the difference in power consumption is unrelated to the resolution(s) of the two cameras 302, 304. For example, in some embodiments the two cameras 302, 304 may have similar (or the same) resolution, but one of the cameras 302, 304 may consume less power than the other camera 304, 302.

With further reference to FIG. 15, the image data 324, 326 may comprise image sensor data such as (but not limited to) exposure values and data regarding pixel values for a particular sized grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments. As described herein, the term "record" may also be referred to as "capture" as appropriate to the requirements of a specific application in accordance with the present embodiments. Further, in the illustrated embodiment, the A/V recording and communication device 300 includes two cameras 302, 304. The present embodiments are not limited, however, to devices having two cameras. Rather, the present embodiments include alternative devices having any number of cameras, such as more than two cameras (e.g., three cameras, four cameras, five cameras, etc.).

Figure 16:
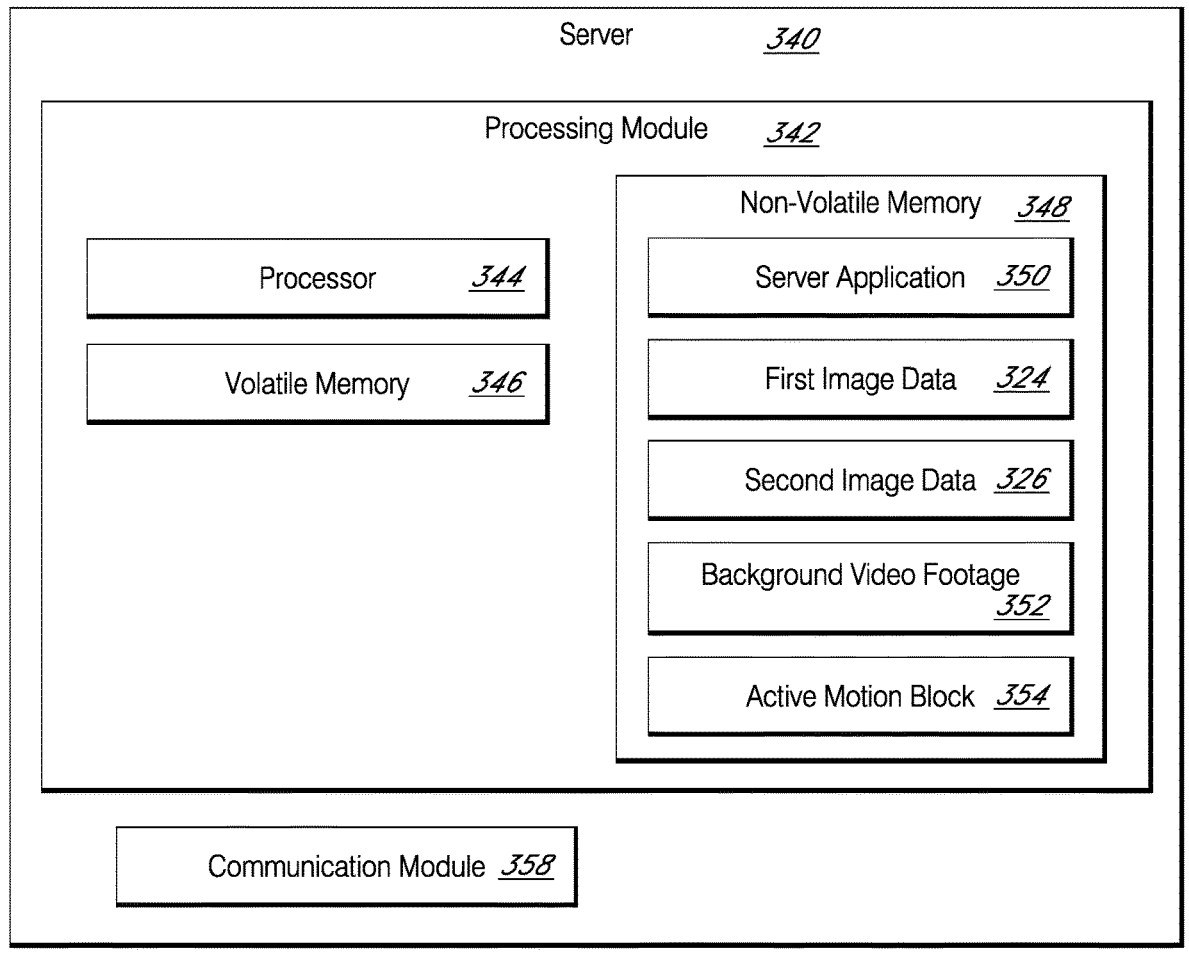
FIG. 16 is a functional block diagram illustrating one embodiment of a server according to various aspects of the present disclosure.

FIG. 16 is a functional block diagram illustrating one embodiment of a server 340 according to various aspects of the present disclosure. In some embodiments, the server 340 may be used with the system illustrated in FIG. 1. For example, the server 340 may take the place of the server 118, or may be used in conjunction with the server 118. The server 340 may also be used in conjunction with the A/V recording and communication device 300 with the system illustrated in FIG. 1. In some embodiments, the server 340 may be in network communication with the A/V recording and communication device 300, where the server 340 may be configured to receive the first image data 324 captured using the first camera 302 and/or the second image data 326 captured using the second camera 304, and may be configured to perform one or more processes for superimposing image data, as further described below.

With reference to FIG. 16, the server 340 may comprise a processing module 342 comprising a processor 344, volatile memory 346, a communication module 358, and non-volatile memory 348. The communication module 358 may allow the server 340 to access and communicate with devices connected to the network (Internet/PSTN) 112 (as illustrated in FIG. 1). The non-volatile memory 348 may include a server application 350 that configures the processor 344 to perform processes for superimposing image data captured using the first camera 302 and the second camera 304, as further described below. In various embodiments, the server application 350 may also configure the processor 344 to superimpose the second image data 326 onto the first image data 324, and/or vice versa. For example, the server application 350 may configure the processor 344 to superimpose the first image data 324 onto the second image data 326 by generating background video footage 352 using the second image data 326 and determining at least one motion block 354 using the first image data 324, as further described below. In various embodiments, the non-volatile memory 348 may save the first image data 324, the second image data 326, the background video footage 352, and the at least one active motion block 354 in the non-volatile memory 348. In alternative embodiments, the first image data 324, the second image data 326, the background video footage 352, and/or the at least one active motion block 354 may be stored in the volatile memory 346, or in a combination of the volatile memory 346 and the non-volatile memory 348.

In the illustrated embodiments of FIGS. 15-16, the various components including (but not limited to) the processing modules 312, 342 and the communication modules 310, 358 are represented by separate boxes. The graphical representations depicted in each of FIGS. 15-16 are, however, merely examples, and are not intended to indicate that any of the various components of the A/V recording and communication device 300, or the server 340, are necessarily physically separate from one another, although in some embodiments they might be. In other embodiments, however, the structure and/or functionality of any or all of the components of the A/V recording and communication device 300 may be combined. For example, in some embodiments the communication module 310 may include its own processor, volatile memory, and/or non-volatile memory. Likewise, the structure and/or functionality of any or all of the components of the server 340, may be combined. For example, in some embodiments the communication module 358 may include its own processor, volatile memory, and/or non-volatile memory.

Figure 17:
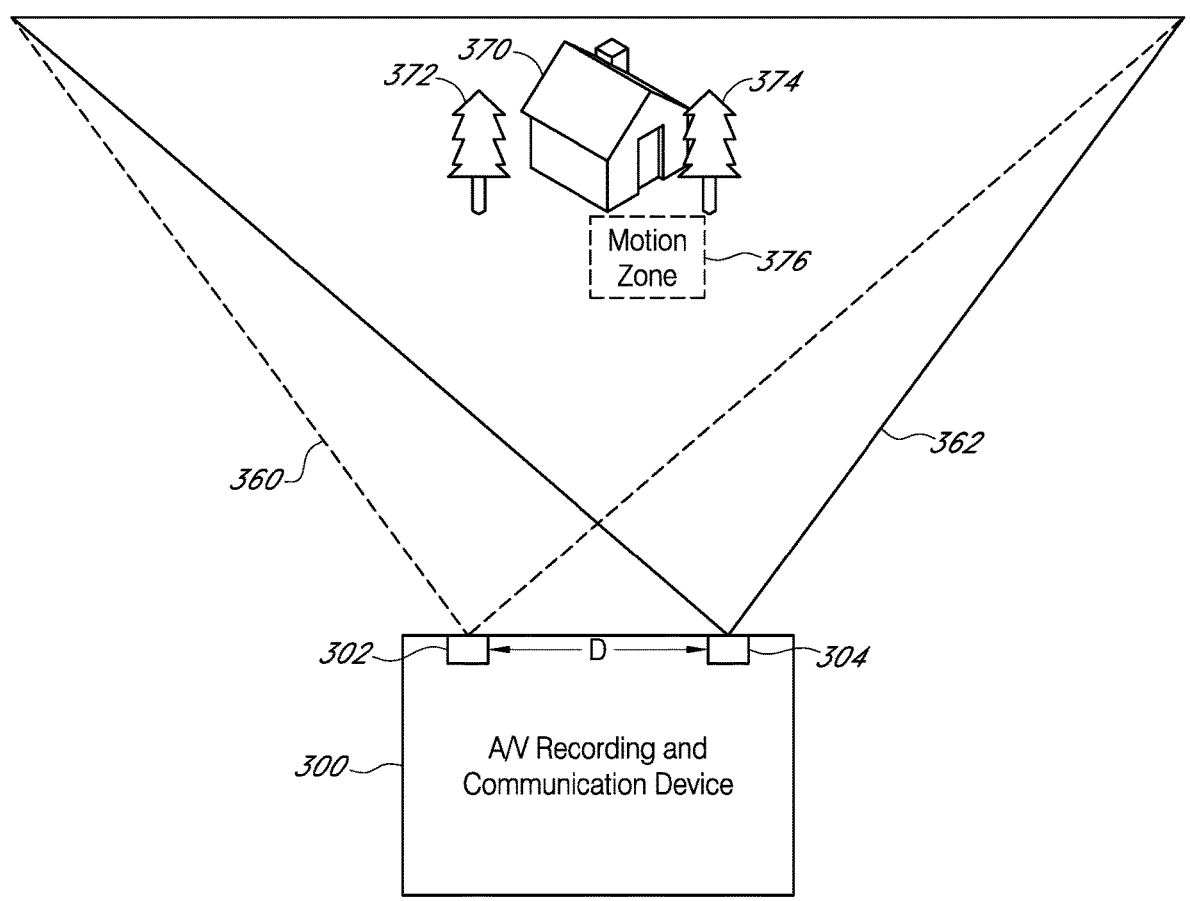
FIG. 17 is a diagram illustrating an A/V recording and communication device having two cameras with substantially coincident fields of view according to various aspects of the present disclosure.

FIG. 17 is a diagram illustrating an A/V recording and communication device 300 having first and second cameras 302, 304 with substantially coincident fields of view 360, 362 according to various aspects of the present disclosure. In some embodiments, the first camera 302 may comprise a first field of view 360 and the second camera 304 may comprise a second field of view 362. The first and second fields of view 360, 362 may be substantially coincident, or may at least have substantial overlap. For example, the first field of view 360 may capture first image data 324 of a first tree 372, a structure 370, and a second tree 374. Likewise, the second field of view 362 may capture second image data 326 of the same first tree 372, structure 370, and second tree 374. In some embodiments, the first camera 302 may be always recording and the second camera 304 may be powered up upon motion detection, as further described below. In one example, the second camera 304 may be powered up and configured to capture second image data 326 when motion is detected in the motion zone 376. In this manner, the user may determine an area of higher importance for monitoring and thus conserve power until motion is detected in the motion zone 376. The overlapping (or substantially coincident) fields of view 360, 362 may, in some embodiments, enable the first and second cameras 302, 304 to work in tandem to achieve various advantages, as further described below. In some embodiments, the first and second cameras 302, 304 may be spaced from one another by a distance D, which may result in the fields of view 360, 362 being not completely coincident, and which may create one or more advantages.

Figure 18:
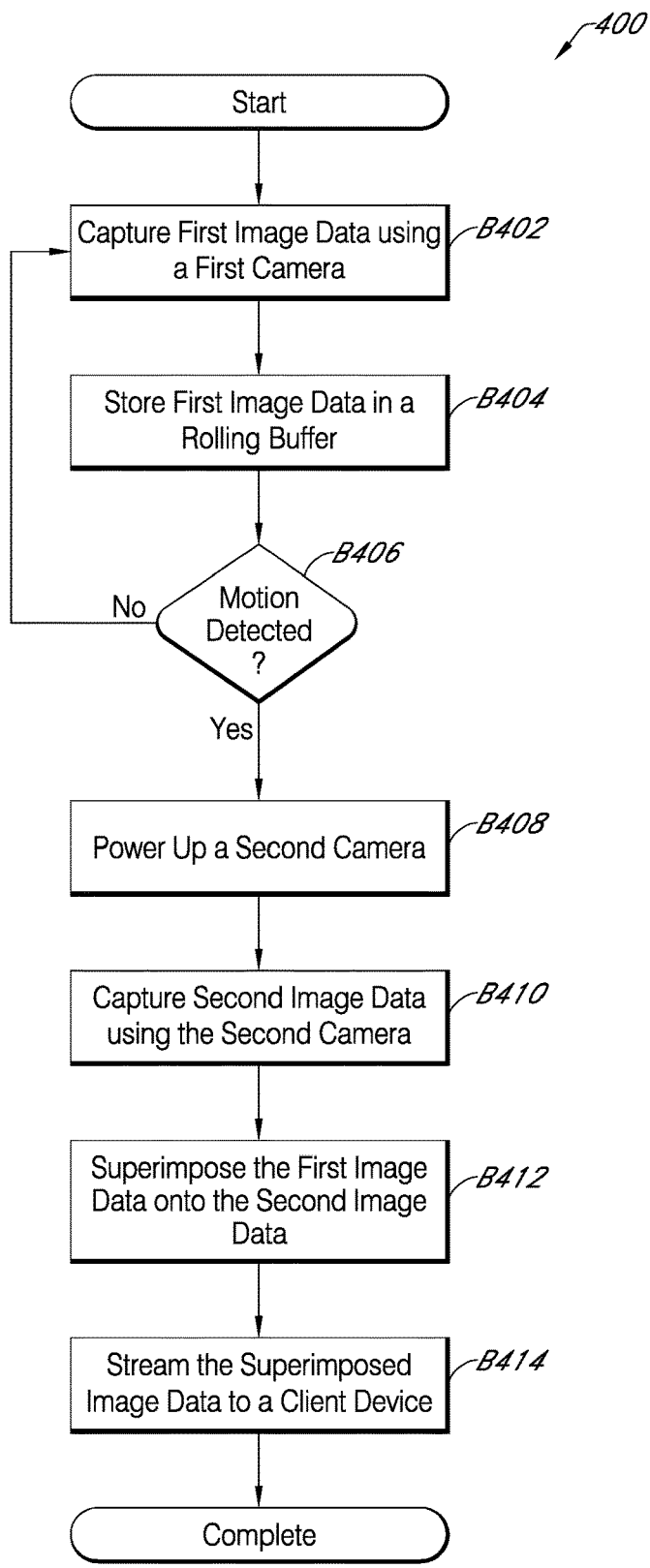
FIG. 18 is a flowchart illustrating an embodiment of a process for superimposing image data from two cameras according to various aspects of the present disclosure.

FIG. 18 is a flowchart illustrating an embodiment of a process 400 for superimposing image data by the A/V recording and communication device 300 according to various aspects of the present disclosure. The process 400 may include capturing (block B402) first image data 324 from the first field of view 360 using the first camera 302. In some embodiments, the first camera 302 may be configured to be maintained in a powered-on state and continuously capture the first image data 324 using the first camera 302. The process 400 may also include storing (block B404) the first image data 324 captured by the first camera 302 to the rolling buffer 322 (or a sliding window, or the like), which may be part of the volatile memory 316 and/or the non-volatile memory 318. A rolling buffer, which may also be referred to as a circular buffer, a circular queue, a cyclic buffer, or a ring buffer, is a data structure that uses a single, fixed-size buffer as if it were connected end-to-end. In some embodiments, about 10-15 seconds (or more, such as 20 seconds, 25 seconds, 30 seconds, etc.) of recorded footage can be continuously stored in the rolling buffer 322.

In reference to FIG. 18, the process may also include detecting (block B406) motion in the first field of view 360 and/or within the motion zone 376. If motion is not detected (block B406), then the process 400 may continue to capture (block B402) first image data 324 and store (block B404) the first image data 324 in the rolling buffer 322. However, if motion is detected (block B406), then the process 400 may include powering up (block B408) the second camera 304 and capturing (block B410) second image data 326 using the second camera 304 from the second field of view 362. In some embodiments, the first image data 324 recorded by the first camera 302 may be used to determine (block B406) whether motion is present in the first field of view 360 and/or the motion zone 376. For example, the processor 314 may be configured to compare pixel value changes in successive video frames of the first image data to determine whether motion is present. If motion is detected in the first field of view 360 and/or the motion zone 376, then the second camera 304 may be powered up and used to capture (block B410) second image data 326 from the second field of view 362. In this manner, the first camera 302, which may consume less power than the second camera 304, may remain powered up so that it can be used for motion detection, and when motion is detected then the second camera 304, which may have higher resolution than the first camera 302, may capture high-resolution image data 326 (e.g., second image data 326). The process may further include superimposing (block B412) a portion of the first image data 324 onto the second image data 326, or vice versa, as further described below.

In further reference to FIG. 18, the process 400 may also include streaming (block B414) the superimposed image data to a client device (such the client device 114 in FIG. 1) using the communication module 310. In some embodiments, the A/V recording and communication device 300 may also stream the second image data 326 captured using the second camera 304 to the client device 114. In some embodiments, the superimposed image data may be prepended as a pre-roll to the second image data 326 and streamed to the client device 114. For example, the superimposed image data may be streamed to the client device 114 at a first stream rate and the second image data 326 captured using the second camera 304 may be streamed to the client device 114 at a second stream rate, wherein the second stream rate is less than the first stream rate. In this manner, the streaming of the second image data 326 can be presented to the user in real time as the streaming of the superimposed image data is streamed to the user's client device 114 at a rate that is higher than the rate at which the second image data 326 is being captured and stored to the non-volatile memory 318. Thus, the user may be provided with a more complete picture of the events that led to the motion detection. In addition, the user may be provided with a higher quality of video footage as the superimposed image data appears of higher quality than if the user was provided with just the first image data being of lower resolution.

Image data such as the first image data 324 and second image data 326 may be a time sequence of frames, where each frame is composed of a grid of pixels. For example, a 1920×1080 frame has 1920 rows and 1080 columns with a pixel located at each intersection of a row and column. Further, each pixel may have numerical values that correspond to color or chroma component (such as Cb, Cr) and a luma or brightness component (Y). Although different methods of pixel valuations exist, YCbCr is a widely used color space coding scheme. In this manner, the camera application 320 may configure the processor 314 to obtain the numerical values that define a pixel in each frame, such as the Cb value, for example. In addition, the human eye is less perceptive to resolution quality where there is motion between frames. Thus, using high-resolution frames for the static background and superimposing active motion blocks of low-resolution frames for portions with motion may give the superimposed image data a perception of higher-resolution to the user. This process is described in further detail below.

Figure 19:
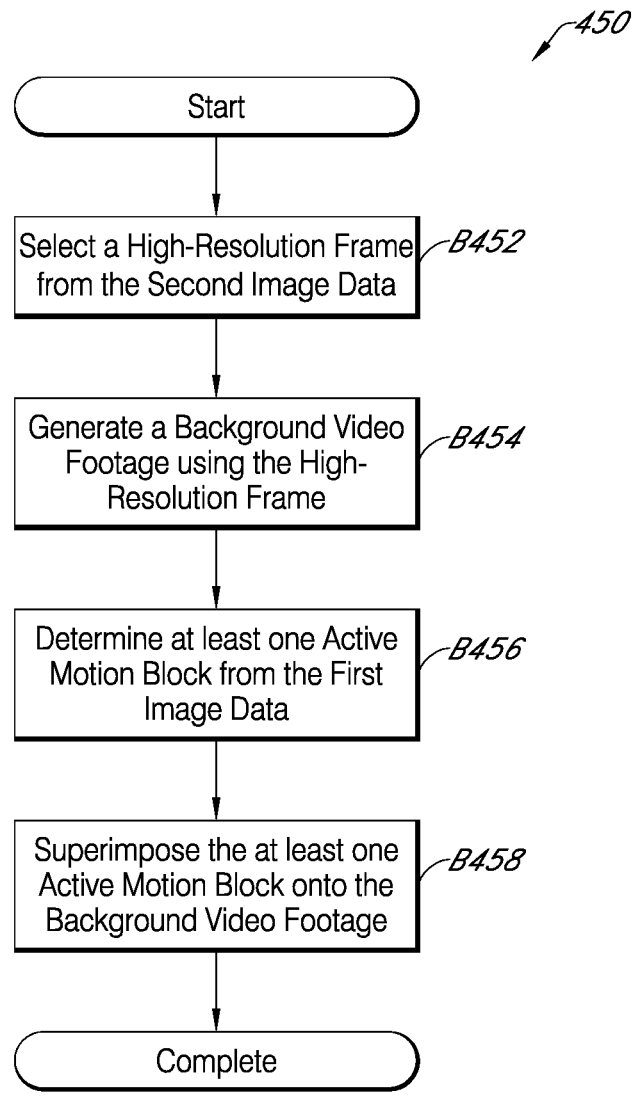
FIG. 19 is a flowchart illustrating an embodiment of a process for superimposing first image data from a first camera onto second image data from a second camera according to various aspects of the present disclosure.

FIG. 19 is a flowchart illustrating an embodiment of a process 450 for superimposing the first image data 324 onto the second image data 326 according to various aspects of the present disclosure. In some embodiments, the first camera 302 may be configured to capture image data (e.g., the first image data 324) at a first resolution and the second camera 304 may be configured to capture image data (e.g., the second image data 326) at a second resolution, where the second resolution is higher than the first resolution. In various embodiments, the first image data 324 that is stored in the rolling buffer 322 may include a plurality of low-resolution frames. The second image data 326 may include at least one high-resolution frame. For example, in embodiments where the second camera 304 powers up and captures a single frame, the second image data 326 may include a single high-resolution frame. However, in embodiments where the second camera 304 powers up and captures more than a single frame, the second image data 326 may include a plurality of high-resolution frames.

In reference to FIG. 19, the process 450 may include selecting (block B452) a high-resolution frame from the second image data 326. The process 450 may also include generating (block B454) a background video footage 328 using the high-resolution frame. In some embodiments, the background video footage 328 may be generated by repeating the single high-resolution frame to create a background video footage of a predetermined length. In various embodiments, the predetermined length may be the same length of time that the rolling buffer 322 is configured to save of the first image data 324. The process 450 may also include determining (block B456) at least one active motion block 330 from the plurality of low-resolution frames of the first image data 324. In some embodiments, the at least one motion blocks 330 may be determined by comparing pixel values of a first one of the low-resolution frames with corresponding pixel values of a second one of the low-resolution frames, as described below. In various embodiments, the active motion blocks 330 may be select portions within a frame and may include the pixel values corresponding to the select portions within the frame. The process 450 may further include superimposing (block B458) the first image data 324 captured using the first camera 302 onto the second image data 326 captured using the second camera 304 by superimposing (block B548) the at least one active motion block onto at least one of the single high-resolution frames of the background video footage 328. In this manner, the pre-roll video footage transmitted to a user's client device (such as client device 114 in FIG. 1) may appear to be of high-resolution as only the portions with active motion are in low-resolution.

Figure 20:
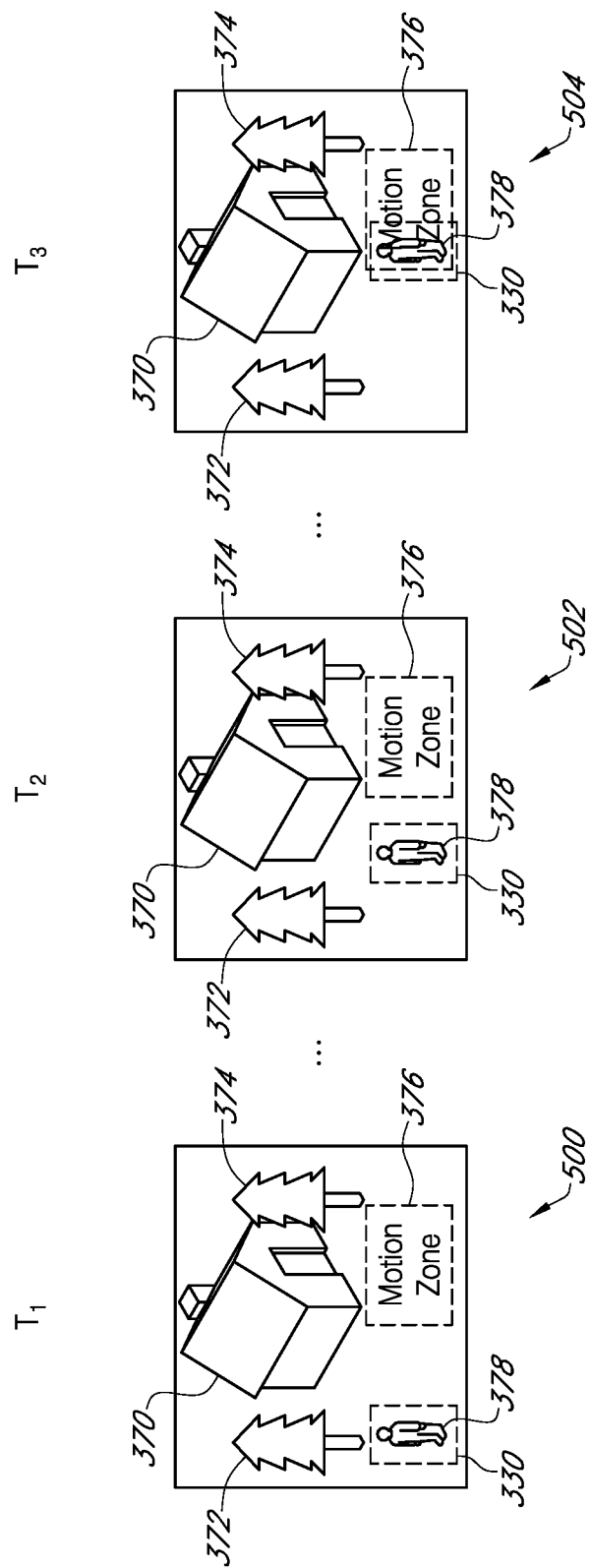
FIG. 20 is a diagram illustrating active motion blocks according to various aspects of the present disclosure.

FIG. 20 is a diagram illustrating a process for determining (block B456) active motion blocks 330 of the first image data 324 according to various aspects of the present disclosure. As described above, the first image data 324 stored in the rolling buffer 322 may include a plurality of low-resolution frames 500, 502, 504. In some embodiments, the at least one active motion block(s) 330 may be determined by comparing pixel values of a first one of the low-resolution frames with corresponding pixel values of a second one of the low-resolution frames. For example, a person 378 may move within the fields of view 360, 362 toward the motion zone 376. At a first time $T_1$, frame 500 includes pixel values illustrating the first tree 372, the structure 370, the second tree 374, and the person 378. In frame 500, the person 378 is in front of the first tree 372 and not within the motion zone 376. At a second time $T_2$, frame 502 again includes pixel values illustrating the first tree 372, the structure 370, the second tree 374, and the person 378. However, the person 378 has moved closer toward the motion zone 376 and is now past the first tree 372 and approaching the motion zone 376. By comparing pixel values of frame 500 with corresponding pixel values of frame 502, the movement of the person 378 may be determined and the portion of the frame including the person 378 may be designated as an active motion block 330. In contrast, the pixel values of the first tree 372, the structure 370, and the second tree 374 have not changed from frame 500 to frame 502 and thus would not be included as an active motion block 330. To further illustrate, at time $T_3$, frame 504 shows that the person 378 has moved into the motion zone 376 and closer to the entrance of the structure 370. Again, by comparing pixel values of frame 502 with corresponding pixel values of frame 504, movement of the person 378 may be determined as an active motion block 330. Further, the person 378 entering the motion zone 376 may also power up the second camera 304, where the second camera 304 captures image data (e.g., the second image data 326) that includes at least one high-resolution frame, as described above. In various embodiments, the active motion blocks 330 may be superimposed onto the at least one of the single high-resolution frames of the background video footage 328, as described above. A person viewing the superimposed image data in the frames 500, 502, 504 would thus see the person 378 (in the active motion block 330 captured by the first camera 302) in low-resolution moving across the static background captured by the high-resolution second camera 304.

In further reference to FIG. 20, in some embodiments, the comparison between frames may include a tolerance level well known in the art to account for subtle movements that may not be of interest to the user and the overall advantages of the system. For example, if the trees 372, 374 move due to wind, the changes in pixel values between frames 500 and 502 corresponding to the trees 372, 374 may be within a tolerance level such that the portion of the frames 500, 502 that includes the trees 372, 374 are not determined to be active motion blocks 330. In some embodiments, the first image data 324 stored in the rolling buffer 322 may be encoded (e.g., pixel values are converted into a compressed format) using either an inter-frame and/or intra-frame compression methods well-known in the art. For example, the first image data 324 may be processed by applying a discrete cosine transform ("DCT") to encode spatial redundancy between frames. In some embodiments, the active motion blocks 330 may be determined using the encoded data points such as (but not limited to) DCT values.

Further, one of skill in the art would recognize that low-resolution frames 500, 502, 504 are for illustrative purposes only. For example, 10-15 seconds of first image data 324 stored in the rolling buffer 322 would include many more low-resolution frames (depending on the frame rate per second) and the number of frames used to determine active motion blocks 330 may depend on the processing capacity and capabilities of the A/V recording and communication device 300. In some embodiments, the various processes for superimposing image data may be performed at the server 340. For example, in such embodiments, the A/V recording and communication device 300 may transmit the first image data 324 captured using the first camera 302 and stored in the rolling buffer 322 and the second image data 326 captured using the second camera 304 to the server 340 using the communication module 310 for processing at the server 340.

Figure 21:
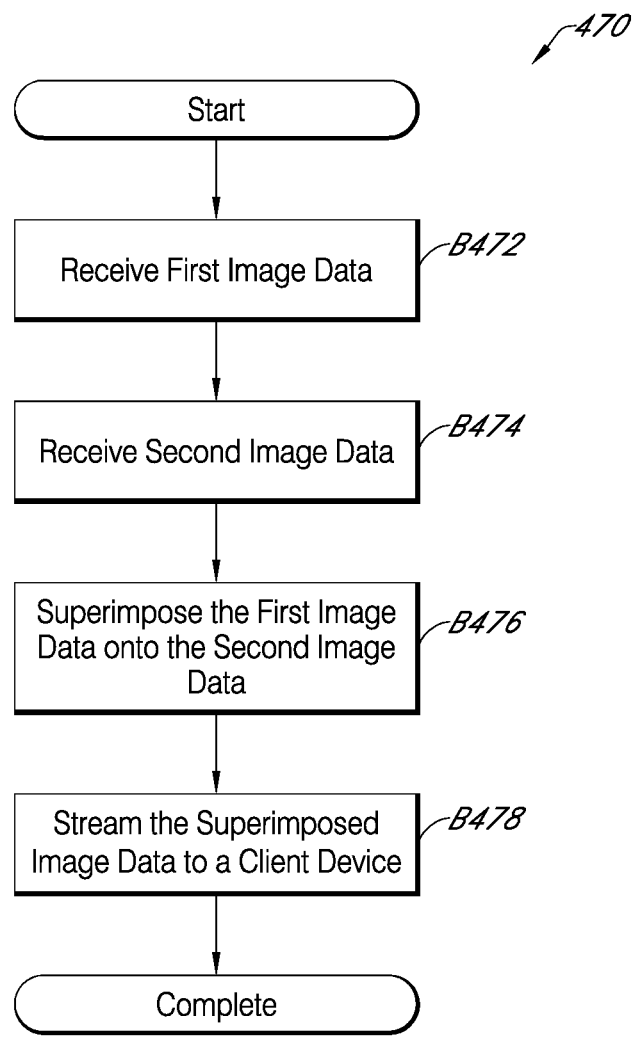
FIG. 21 is a flowchart illustrating another embodiment of a process for superimposing image data according to various aspects of the present disclosure.

FIG. 21 is a flowchart illustrating another embodiment of a process 470 for superimposing image data according to various aspects of the present disclosure. In various embodiments, the process 470 may be performed using the server 340 and include receiving (block B472) first image data 324 using the communication module 358, where the first image data 324 is captured using the first camera 302 and stored in the rolling buffer 322 of the A/V recording and communication device 300. The process 470 may also include receiving (block B474) second image data 326 captured using the second camera 304 using the communication module 358. The first image data 324 may include a plurality of low-resolution frames and the second image data 326 may include at least one high-resolution frame, as described above. The process 470 may further include superimposing (block B476) the first image data 324 onto the second image data 326, or vice versa, where the processor 344 may be configured by the server application 350 to perform the processes as described above with respect to FIGS. 19 and 20.

In further reference to FIG. 21, the process 470 may include streaming (block B478) the first image data 324 superimposed onto the second image data 326 to a client device (such as the client device 114 in FIG. 1) using the communication module 358. In some embodiments, the server 340 may also stream the second image data 326 captured using the second camera 304 to the client device 114. In some embodiments, the superimposed image data may be prepended as a pre-roll to the second image data 326 and streamed to the client device 114. In this manner, the user may be provided with a more complete picture of the events that led to the motion detection. For example, the superimposed image data may be streamed to the client device 114 at a first stream rate and the second image data 326 captured using the second camera 304 may be streamed to the client device 114 at a second stream rate, wherein the second stream rate is less than the first stream rate.

Figure 22:
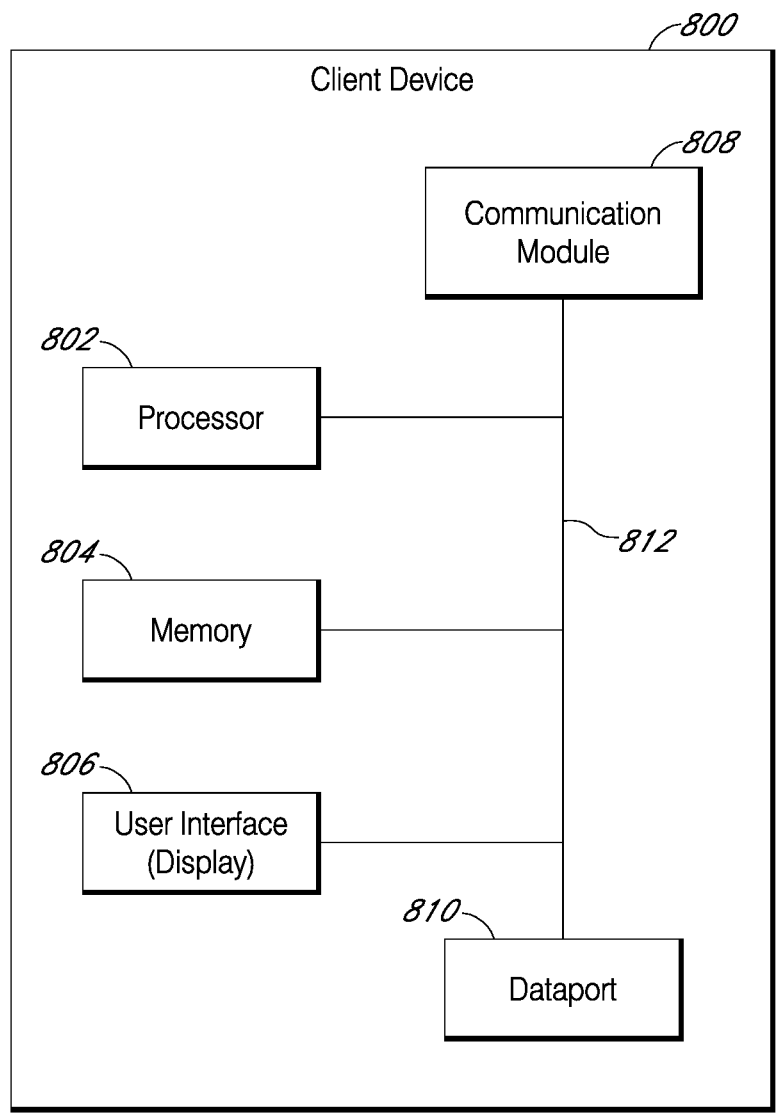
FIG. 22 is a functional block diagram of a client device on which the present embodiments may be implemented according to various aspects of the present disclosure.

FIG. 22 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 22, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM)). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 23:
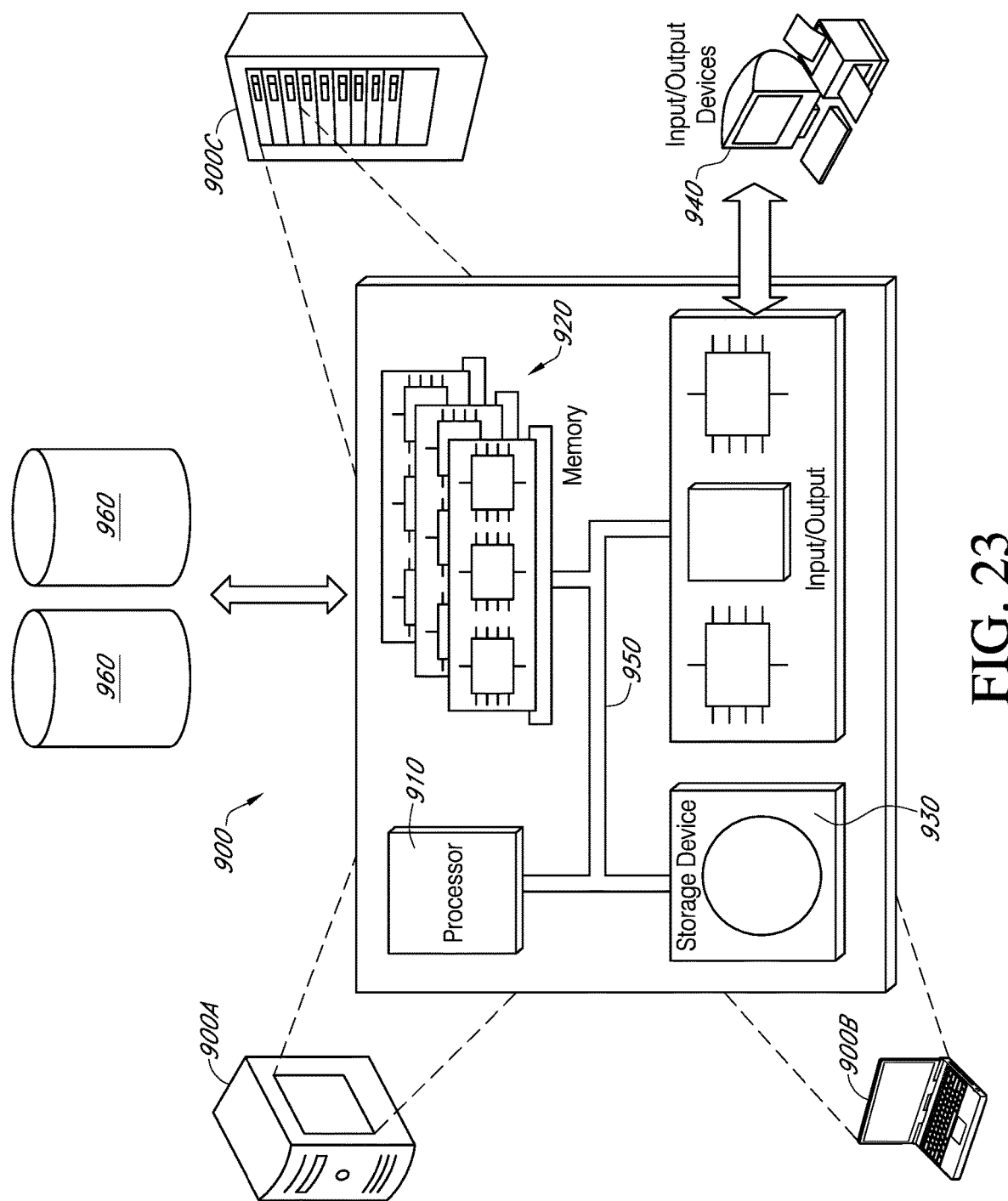
FIG. 23 is a functional block diagram of a general-purpose computing system on which the present embodiments may be implemented according to various aspects of present disclosure.

FIG. 23 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940.

Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LA/V (local area network), a WA/V (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

In a first aspect, an audio/video (A/V) recording and communication device is provided, the device comprising: a first camera configured to capture image data at a first resolution; a second camera configured to capture image data at a second resolution, wherein the second resolution is higher than the first resolution; a memory including a rolling buffer; a communication module; and a processing module operatively connected to the first camera, the memory, and the communication module, the processing module comprising: a processor; and a camera application, wherein the camera application configures the processor to: capture first image data using the first camera; store the first image data captured using the first camera in the rolling buffer of the memory; maintain the second camera in a low-power state; power up the second camera in response to motion detection; capture second image data using the second camera; and superimpose the first image data captured using the first camera onto the second image data captured using the second camera.

In an embodiment of the first aspect, the camera application further configures the processor to maintain the first camera in a powered-on state and continuously capture the first image data using the first camera.

In another embodiment of the first aspect, the camera application further configures the processor to place the first camera into a low-power state when the second camera is powered up.

In another embodiment of the first aspect, the camera application further configures the processor to revert the second camera to the low-power state when the detected motion is no longer present.

In another embodiment of the first aspect, the camera application further configures the processor to power up the first camera when the second camera is reverted to the low-power state.

In another embodiment of the first aspect, the camera application further configures the processor to power up the second camera in response to motion in a field of view of the first camera.

In another embodiment of the first aspect, the camera application further configures the processor to power up the second camera in response to motion detection in a motion zone.

In another embodiment of the first aspect, the A/V recording and communication device further comprises a passive infrared (PIR) sensor and wherein the camera application further configures the processor to detect motion using the PIR sensor.

In another embodiment of the first aspect, the camera application further configures the processor to detect motion using the first image data captured using the first camera.

In another embodiment of the first aspect, the rolling buffer is configured to store 10-15 seconds of the first image data.

In another embodiment of the first aspect, the camera application further configures the processor to select a single high-resolution frame from the second image data captured using the second camera.

In another embodiment of the first aspect, the camera application further configures the processor to generate background video footage by repeating the single high-resolution frame.

In another embodiment of the first aspect, the first image data stored in the rolling buffer comprises a plurality of low-resolution frames.

In another embodiment of the first aspect, the camera application further configures the processor to determine at least one active motion block within the plurality of low-resolution frames.

In another embodiment of the first aspect, the camera application further configures the processor to determine the at least one active motion block by comparing pixel values of a first one of the low-resolution frames with corresponding pixel values of a second one of the low-resolution frames.

In another embodiment of the first aspect, the camera application further configures the processor to superimpose the first image data captured using the first camera onto the second image data captured using the second camera by superimposing the at least one action motion block onto at least one of the single high-resolution frames of the background video footage.

In another embodiment of the first aspect, the camera application further configures the processor to stream the second image data captured using the second camera to a client device using the communication module.

In another embodiment of the first aspect, the camera application further configures the processor to stream the first image data superimposed onto the second image data to the client device using the communication module.

In another embodiment of the first aspect, the camera application further configures the processor to stream the first image data superimposed onto the second image data to the client device at a first stream rate and stream the second image data captured using the second camera to the client device at a second stream rate, wherein the second stream rate is less than the first stream rate.

In another embodiment of the first aspect, the camera application further configures the processor to transmit the first image data stored in the rolling buffer and the second image data captured using the second camera to a server using the communication module.

In a second aspect, a method for an audio/video (A/V) recording and communication device is provided, the device comprising a first camera configured to capture image data at a first resolution, a second camera configured to capture image data at a second resolution, wherein the second resolution is higher than the first resolution, and a memory including a rolling buffer, the method comprising: capturing first image data using the first camera having a first field of view; storing the first image data captured using the first camera in the rolling buffer of the memory; maintaining the second camera in a low-power state; powering up the second camera in response to motion detection; capturing second image data using the second camera having a second field of view, wherein the first and second fields of views substantially overlap; and superimposing the first image data captured using the first camera onto the second image data captured using the second camera.

An embodiment of the second aspect further comprises maintaining the first camera in a powered-on state and continuously capturing the first image data using the first camera.

Another embodiment of the second aspect further comprises placing the first camera into a low-power state when the second camera is powered up.

Another embodiment of the second aspect further comprises reverting the second camera to the low-power state when the detected motion is no longer present.

Another embodiment of the second aspect further comprises powering up the first camera when the second camera is reverted to the low-power state.

Another embodiment of the second aspect further comprises powering up the second camera in response to motion in a field of view of the first camera.

Another embodiment of the second aspect further comprises powering up the second camera in response to motion detection in a motion zone.

In another embodiment of the second aspect, the A/V recording and communication device further comprises a passive infrared (PIR) sensor and the method further comprises detecting motion using the PIR sensor.

Another embodiment of the second aspect further comprises detecting motion using the first image data captured using the first camera.

In another embodiment of the second aspect, the rolling buffer is configured to store 10-15 seconds of the first image data.

Another embodiment of the second aspect further comprises selecting a single high-resolution frame from the second image data captured using the second camera.

Another embodiment of the second aspect further comprises generating background video footage by repeating the single high-resolution frame.

In another embodiment of the second aspect, the first image data stored in the rolling buffer comprises a plurality of low-resolution frames.

Another embodiment of the second aspect further comprises determining at least one active motion block within the plurality of low-resolution frames.

Another embodiment of the second aspect further comprises determining the at least one active motion block by comparing pixel values of a first one of the low-resolution frames with corresponding pixel values of a second one of the low-resolution frames.

Another embodiment of the second aspect further comprises superimposing the first image data captured using the first camera onto the second image data captured using the second camera by superimposing the at least one action motion block onto at least one of the single high-resolution frames of the background video footage.

Another embodiment of the second aspect further comprises streaming the second image data captured using the second camera to a client device using the communication module.

Another embodiment of the second aspect further comprises streaming the first image data superimposed onto the second image data to the client device using the communication module.

Another embodiment of the second aspect further comprises streaming the first image data superimposed onto the second image data to the client device at a first stream rate and streaming the second image data captured using the second camera to the client device at a second stream rate, wherein the second stream rate is less than the first stream rate.

Another embodiment of the second aspect further comprises transmitting the first image data stored in the rolling buffer and the second image data captured using the second camera to a server using the communication module.

In a third aspect, a server for audio/video (A/V) recording and communication devices is provided, the server comprising: a communication module; and a processing module operatively connected to the communication module, the processing module comprising: a processor; and a server application, wherein the server application configures the processor to: receive first image data captured at a first resolution using a first camera of the A/V recording and communication device; receive second image data captured at a second resolution using a second camera of the A/V recording and communication device, wherein the second resolution is higher than the first resolution; and superimpose the first image data captured using the first camera onto the second image data captured using the second camera.

In an embodiment of the third aspect, the first image data captured using the first camera is stored in a rolling buffer of a memory in the A/V recording and communication device.

In another embodiment of the third aspect, the rolling buffer is configured to store 10-15 seconds of the first image data.

In another embodiment of the third aspect, the server application further configures the processor to select a single high-resolution frame from the second image data captured using the second camera.

In another embodiment of the third aspect, the server application further configures the processor to generate background video footage by repeating the single high-resolution frame.

In another embodiment of the third aspect, the first image data captured using the first camera comprises a plurality of low-resolution frames.

In another embodiment of the third aspect, the server application further configures the processor to determine at least one active motion block within the plurality of low-resolution frames.

In another embodiment of the third aspect, the server application configures the processor to determine the at least one active motion block by comparing pixel values of a first one of the low-resolution frames with corresponding pixel values of a second one of the low-resolution frames.

In another embodiment of the third aspect, the server application further configures the processor to superimpose the first image data captured using the first camera onto the second image data captured using the second camera by superimposing the at least one action motion block onto at least one of the single high-resolution frames of the background video footage.

In another embodiment of the third aspect, the server application further configures the processor to stream the second image data captured using the second camera to a client device using the communication module.

In another embodiment of the third aspect, the server application further configures the processor to stream the first image data superimposed onto the second image data to the client device using the communication module.

In another embodiment of the third aspect, the server application further configures the processor to stream the first image data superimposed onto the second image data to the client device at a first stream rate and stream the image data captured using the second camera to the client device at a second stream rate, wherein the second stream rate is less than the first stream rate.

In a fourth aspect, a method for a server comprising a communication module and a processing module operatively connected to the communication module is provided, the method comprising: receiving first image data captured at a first resolution using a first camera, having a first field of view, of an audio/video (A/V) recording and communication device; receiving second image data captured at a second resolution using a second camera, having a second field of view, of the A/V recording and communication device, wherein the second resolution is higher than the first resolution and the first and second fields of view substantially overlap; and superimposing the first image data captured using the first camera onto the second image data captured using the second camera.

In an embodiment of the fourth aspect, the first image data captured using the first camera is stored in a rolling buffer of a memory in the A/V recording and communication device.

In another embodiment of the fourth aspect, the rolling buffer is configured to store 10-15 seconds of the first image data.

Another embodiment of the fourth aspect further comprises selecting a single high-resolution frame from the second image data captured using the second camera.

Another embodiment of the fourth aspect further comprises generating background video footage by repeating the single high-resolution frame.

In another embodiment of the fourth aspect, the first image data captured using the first camera comprises a plurality of low-resolution frames.

Another embodiment of the fourth aspect further comprises determining at least one active motion block within the plurality of low-resolution frames.

Another embodiment of the fourth aspect further comprises determining the at least one active motion block by comparing pixel values of a first one of the low-resolution frames with corresponding pixel values of a second one of the low-resolution frames.

Another embodiment of the fourth aspect further comprises superimposing the first image data captured using the first camera onto the second image data captured using the second camera by superimposing the at least one action motion block onto at least one of the single high-resolution frames of the background video footage.

Another embodiment of the fourth aspect further comprises streaming the second image data captured using the second camera to a client device using the communication module.

Another embodiment of the fourth aspect further comprises streaming the first image data superimposed onto the second image data to the client device using the communication module.

Another embodiment of the fourth aspect further comprises streaming the first image data superimposed onto the second image data to the client device at a first stream rate and streaming the image data captured using the second camera to the client device at a second stream rate, wherein the second stream rate is less than the first stream rate.

In a fifth aspect, a program, stored in a non-transitory machine-readable medium of a server, for superimposing image data captured by at least one audio/video recording and communication device (A/V device), the program executable by at least one processor of the server is provided, the program comprising instructions for: receiving first image data captured at a first resolution using a first camera of an A/V device; receiving second image data captured at a second resolution using a second camera of the A/V device, wherein the second resolution is higher than the first resolution; and superimposing the first image data captured using the first camera onto the second image data captured using the second camera.

In an embodiment of the fifth aspect, the first image data captured using the first camera is stored in a rolling buffer of a memory in the A/V device.

In another embodiment of the fifth aspect, the rolling buffer is configured to store 10-15 seconds of the first image data.

In another embodiment of the fifth aspect, the program comprises further instructions for selecting a single high-resolution frame from the second image data captured using the second camera.

In another embodiment of the fifth aspect, the program comprises further instructions for generating background video footage by repeating the single high-resolution frame.

In another embodiment of the fifth aspect, the first image data captured using the first camera comprises a plurality of low-resolution frames.

In another embodiment of the fifth aspect, the program comprises further instructions for determining at least one active motion block within the plurality of low-resolution frames.

In another embodiment of the fifth aspect, the program comprises further instructions for determining the at least one active motion block by comparing pixel values of a first one of the low-resolution frames with corresponding pixel values of a second one of the low-resolution frames.

In another embodiment of the fifth aspect, the program comprises further instructions for superimposing the first image data onto the second image data by superimposing the at least one active motion block onto at least one of the single high-resolution frames of the background video footage.

In another embodiment of the fifth aspect, the program comprises further instructions for streaming the superimposed image data to a client device at a first stream rate and streaming the second image data captured to the client device at a second stream rate, wherein the second stream rate is less than the first stream rate.

In a sixth aspect, a method for at least one server for superimposing image data captured by at least one audio/video recording and communication device (A/V device) is provided, the method comprising: receiving first image data captured at a first resolution using a first camera of an A/V device; receiving second image data captured at a second resolution using a second camera of the A/V device, wherein the second camera is maintained in a low-power state and powered up in response to motion detection and wherein the second resolution is higher than the first resolution; and superimposing the first image data captured using the first camera onto the second image data captured using the second camera.

In an embodiment of the sixth aspect, the first image data captured using the first camera is stored in a rolling buffer of a memory in the A/V device.

In another embodiment of the sixth aspect, the rolling buffer is configured to store 10-15 seconds of the first image data.

In another embodiment of the sixth aspect, the method further comprises selecting a single high-resolution frame from the second image data captured using the second camera.

In another embodiment of the sixth aspect, the method further comprises generating background video footage by repeating the single high-resolution frame.

In another embodiment of the sixth aspect, the first image data captured using the first camera comprises a plurality of low-resolution frames.

In another embodiment of the sixth aspect, the method further comprises determining at least one active motion block within the plurality of low-resolution frames.

In another embodiment of the sixth aspect, the method further comprises determining the at least one active motion block by comparing pixel values of a first one of the low-resolution frames with corresponding pixel values of a second one of the low-resolution frames.

In another embodiment of the sixth aspect, the method further comprises superimposing the first image data captured using the first camera onto the second image data captured using the second camera by superimposing the at least one active motion block onto at least one of the single high-resolution frames of the background video footage.

In another embodiment of the sixth aspect, the method further comprises streaming the superimposed image data to a client device at a first stream rate and streaming the second image data to the client device at a second stream rate, wherein the second stream rate is less than the first stream rate.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A non-transitory machine-readable medium having stored thereon instructions that, when executed by a processing device of a server, cause the server to perform a method for superimposing image data captured by at least one audio/video recording and communication device (A/V device), the method comprising:

receiving first image data captured at a first resolution using a first camera of an A/V device;

receiving second image data captured at a second resolution using a second camera of the A/V device, wherein the second resolution is higher than the first resolution; and superimposing the first image data captured using the first camera onto the second image data captured using the second camera, wherein the first camera and second camera have substantially coincident fields of view.

2. The program, stored in the non-transitory machine-readable medium of claim 1, wherein the first image data captured using the first camera is stored in a rolling buffer of a memory in the A/V device.

3. The program, stored in the non-transitory machine-readable medium of claim 2, wherein the rolling buffer is configured to store 10-15 seconds of the first image data.

4. The program, stored in the non-transitory machine-readable medium of claim 1, wherein the program comprises further instructions for selecting a single high-resolution frame from the second image data captured using the second camera.

5. The program, stored in the non-transitory machine-readable medium of claim 4, wherein the program comprises further instructions for generating background video footage by repeating the single high-resolution frame.

6. The program, stored in the non-transitory machine-readable medium of claim 5, wherein the first image data captured using the first camera comprises a plurality of low-resolution frames.

7. The program, stored in the non-transitory machine-readable medium of claim 6, wherein the program comprises further instructions for determining at least one active motion block within the plurality of low-resolution frames.

8. The program, stored in the non-transitory machine-readable medium of claim 7, wherein the program comprises further instructions for determining the at least one active motion block by comparing pixel values of a first one of the low-resolution frames with corresponding pixel values of a second one of the low-resolution frames.

9. The program, stored in the non-transitory machine-readable medium of claim 8, wherein the program comprises further instructions for superimposing the first image data onto the second image data by superimposing the at least one active motion block onto at least one of the single high-resolution frames of the background video footage.

10. The program, stored in the non-transitory machine-readable medium of claim 1, wherein the program comprises further instructions for streaming the superimposed image data to a client device at a first stream rate and streaming the second image data captured to the client device at a second stream rate, wherein the second stream rate is less than the first stream rate.

11. A method for at least one server for superimposing image data captured by at least one audio/video recording and communication device (A/V device), the method comprising:

receiving first image data captured at a first resolution using a first camera of an A/V device;

receiving second image data captured at a second resolution using a second camera of the A/V device, wherein the second camera is maintained in a low-power state and powered up in response to motion detection and wherein the second resolution is higher than the first resolution; and superimposing the first image data captured using the first camera onto the second image data captured using the second camera, wherein the first camera and second camera have substantially coincident fields of view.

12. The method of claim 11, wherein the first image data captured using the first camera is stored in a rolling buffer of a memory in the A/V device.

13. The method of claim 12, wherein the rolling buffer is configured to store 10-15 seconds of the first image data.

14. The method of claim 11, further comprising selecting a single high-resolution frame from the second image data captured using the second camera.

15. The method of claim 14, further comprising generating background video footage by repeating the single high-resolution frame.

16. The method of claim 15, wherein the first image data captured using the first camera comprises a plurality of low-resolution frames.

17. The method of claim 16, further comprising determining at least one active motion block within the plurality of low-resolution frames.

18. The method of claim 17, further comprising determining the at least one active motion block by comparing pixel values of a first one of the low-resolution frames with corresponding pixel values of a second one of the low-resolution frames.

19. The method of claim 18, further comprising superimposing the first image data captured using the first camera onto the second image data captured using the second camera by superimposing the at least one active motion block onto at least one of the single high-resolution frames of the background video footage.

20. The method of claim 11, further comprising streaming the superimposed image data to a client device at a first stream rate and streaming the second image data to the client device at a second stream rate, wherein the second stream rate is less than the first stream rate.

* * * * *